(12) United States Patent
Harris et al.

(10) Patent No.: US 11,975,926 B2
(45) Date of Patent: May 7, 2024

(54) AUTOMATED BELT-DIVERTER SYSTEM

(71) Applicant: Staples, Inc., Framingham, MA (US)

(72) Inventors: Calem Harris, Tampa, FL (US); Sebastian Mora, Davenport, FL (US); Grant Tucker, Orlando, FL (US); Arun Kumar Ranganathan Jagannathan, Shrewsbury, MA (US); Carl Skantze, Tampa, FL (US); Arnold Tsoka, Orlando, FL (US); Mario Faulkner, Wesley Chapel, FL (US)

(73) Assignee: Staples, Inc., Framingham, MA (US)

( * ) Notice: Subject to any disclaimer, the term of this patent is extended or adjusted under 35 U.S.C. 154(b) by 0 days.

(21) Appl. No.: 17/810,263

(22) Filed: Jun. 30, 2022

(65) Prior Publication Data

US 2023/0348203 A1 Nov. 2, 2023

Related U.S. Application Data

(63) Continuation-in-part of application No. 17/661,702, filed on May 2, 2022, now Pat. No. 11,911,803.

(51) Int. Cl.
*B65G 47/82* (2006.01)
*B07C 5/36* (2006.01)
(Continued)

(52) U.S. Cl.
CPC ............ *B65G 47/82* (2013.01); *B65G 47/44* (2013.01); *B65G 47/46* (2013.01)

(58) Field of Classification Search
CPC ...................................................... B65G 47/82
(Continued)

(56) References Cited

U.S. PATENT DOCUMENTS 3,071,239 A * 1/1963 Burtness ............... B65G 47/82
198/370.07
4,058,199 A 11/1977 Schlagel
(Continued)

FOREIGN PATENT DOCUMENTS

| AU | 2009238310 A1 | 6/2010 |
| CN | 212103473 U | 12/2020 |
| CN | 112024419 B | 4/2022 |

OTHER PUBLICATIONS

Xu; Qiang, "Automatic opening and closing door discharging device" (English Translation), Dec. 8, 2020, worldwide.epacenet.com (Year: 2020).
(Continued)

*Primary Examiner* — Michael McCullough
*Assistant Examiner* — Molly K Devine
(74) *Attorney, Agent, or Firm* — VLP Law Group LLP; Michel Bohn

(57) ABSTRACT

An automated belt-based diverter system is described in some implementations. In an example implementation, the system may include a belt, which includes a closed loop of material, coupled with a pulley and a motor that provides motive force to the belt, for example, using the pulley. In some implementations, one or more diverter arms may be coupled with the belt. A diverter arm may include a body with a first arm end, a second arm end, and a pushing surface. A diverter arm may be coupled at the first end with the belt so that the second end extends away from the belt and the pushing surface may contact an object to push the item. The system may also include a controller coupled with the motor to rotate the belt in defined directions or distances based on instructions.

20 Claims, 18 Drawing Sheets

(51) Int. Cl.
*B65G 47/44* (2006.01)
*B65G 47/46* (2006.01)

(58) Field of Classification Search
USPC .......................... 198/370.02, 370.07, 370.08
See application file for complete search history.

(56) References Cited

U.S. PATENT DOCUMENTS

| | | | | |
|---|---|---|---|---|
| 6,227,350 | B1 * | 5/2001 | Yoshizako | B65G 45/12 |
| | | | | 15/256.5 |
| 6,460,681 | B1 | 10/2002 | Coutant et al. | |
| 6,688,459 | B1 * | 2/2004 | Bonham | B65G 47/82 |
| | | | | 209/916 |
| 6,695,135 | B1 * | 2/2004 | Lapeyre | B65G 17/08 |
| | | | | 198/853 |
| 7,650,985 | B2 | 1/2010 | Day | |
| 9,192,965 | B2 | 11/2015 | Serjeantson et al. | |
| 10,646,991 | B2 | 5/2020 | Wagner et al. | |
| 10,981,732 | B2 * | 4/2021 | Eisenberg | B65G 47/841 |
| 11,208,272 | B2 * | 12/2021 | Battles | G06Q 50/28 |
| 2020/0024014 | A1 | 1/2020 | Warmulla | |

OTHER PUBLICATIONS

Zhang; Hongqing "Crossed Belt Type Sorting System and Sorting System" (English Translation), Dec. 4, 2020, worldwide.epacenet.com (Year: 2020).

\* cited by examiner

AUTOMATED BELT-DIVERTER SYSTEM

BACKGROUND

This application relates to warehouse fulfillment systems. For example, this application relates to a diverter system for diverting objects from one location to another location, for example, during transit of the object on a conveyor belt.

Some warehouse fulfillment systems move objects from zone to zone within a warehouse using conveyor belts. In order to change a conveyor belt or other device by which objects are transported, various mechanisms are used to push or pull objects. For example, some existing solutions use pneumatic or hydraulic rams, which push objects off a conveyor belt onto a second conveyor belt. Unfortunately, these traditional mechanisms are slow, inaccurate, only move in a single direction, and must be reset to a starting position before they can divert a subsequent object. For instance, a pneumatic push ram diverter would extend to divert an object, retract to a starting position, and then extend to push a second object in the same direction. The process of resetting requires significant power and time, so it limits the rate or density of items that can be diverted. Accordingly, a faster method and system for diverting items are desirable.

SUMMARY

An automated sorting and packing system can be configured to perform particular operations or actions by virtue of having software, firmware, hardware, or a combination of them installed on the system that in operation causes or cause the system to perform the actions. One general aspect of the system includes a belt coupled with one or more pulleys, the belt including a closed loop of material, the one or more pulleys providing support to the belt; a motor coupled with the one or more pulleys and providing motive force to the belt via the one or more pulleys; one or more diverter arms coupled with the belt, each of the one or more diverter arms including a body with a first arm end, a second arm end, and a first pushing surface, the first arm end being coupled with the belt, the second arm end extending away from the belt, and the pushing surface contacting one or more objects to push the one or more objects; and a controller coupled with the motor to instruct the motor to rotate the belt.

Implementations of the system may include one or more of the following features. The system further including: that the belt includes a plurality of holes on the belt housing threaded inserts, the threaded inserts mating with the first arm end of the one or more diverter arms; that the one or more diverter arms include a first paddle mounted to a first point on the belt and a second paddle mounted to a second point on the belt; that the first point is substantially opposite to the second point around a circumference of the closed loop of the belt; that the first point and the second point are separated on at least one side by a length of the material of the belt, the length of the belt including no diverter arms; and that the body of the one or more diverter arms is elongated and the elongated body extends longitudinally away from the belt at the first arm end.

Implementations of the system may include one or more of the following features. A diverter-arm mounting bracket coupling the first arm end of the one or more diverter arms with the belt, the diverter-arm mounting bracket including a first point that remains in contact with the belt when the belt flexes around the one or more pulleys, the diverter-arm mounting bracket including a second point that is in contact with the belt when the belt is flat at the second point and not in contact with the belt when the belt flexes around the one or more pulleys at the second point; a first diverter arm of the one or more diverter arms includes the first pushing surface on a first side and a second pushing surface on a second side of the first diverter arm opposite to the first pushing surface, the first pushing surface pushing the one or more objects toward a first end of the diverter mechanism when the motor rotates in a first direction and the second pushing surface pushing the one or more objects in toward a second end of the diverter mechanism when the motor rotates in a second direction opposite to or the same as the first direction; that the one or more diverter arms include a first diverter arm attached to the belt and a second diverter arm attached to the belt, the first diverter arm moving toward a first end of the diverter mechanism and the second diverter arm moving toward a second end of the diverter mechanism when the belt rotates around the one or more pulleys, the first end of the diverter mechanism being opposite to the second end of the diverter mechanism; and a frame coupled with and providing support to the one or more pulleys, the frame mounting the belt above a loading area, the first pushing surface of the one or more diverter arms extending into the loading area to push an item from the loading area.

Another general aspect includes a method including: determining, by one or more processors, a first direction to divert a first item from a loading area based on a first received instruction; determining, by the one or more processors, a first distance from a first position of a belt to rotate the belt in the first direction; rotating, by the one or more processors, the belt around one or more pulleys by the first distance in the first direction from the first position to a second position, the belt having one or more diverter arms coupled with the belt, the one or more diverter arms moving with the rotation of the belt; moving, by the one or more processors, the first item on a conveyor in a second direction, the second direction being perpendicular to the first direction, the loading area being on the conveyor, the first item being diverted from the conveyor by the one or more diverter arms when the belt is rotated in the first direction; determining, by the one or more processors, that the first item has been diverted by the rotation of the belt, the one or more diverter arms contacting the first item to divert the first item; transmitting, by the one or more processors, a confirmation message to a computing system indicating that the first item has been diverted; that rotating the belt by the first distance in the first direction includes moving a first diverter arm of the one or more diverter arms from a first end of a diverter mechanism to a second end of the diverter mechanism to divert the first item, the diverter mechanism including the belt, the one or more diverter arms, and a motor applying motive force to the belt; and moving a second diverter arm of the one or more diverter arms to the first end based on moving the first diverter arm from the first end of the diverter mechanism to the second end of the diverter mechanism.

Implementations of the operations may include one or more of the following features. Determining, by the one or more processors, to divert a second item based on a second instruction; diverting the second item including rotating, by the one or more processors, the belt in a second direction from the second position to a third position, the second direction being opposite to the first direction; determining, by the one or more processors, to divert a second item based on a second instruction; diverting the second item including rotating, by the one or more processors, the belt in a second direction from the second position to a third position, the second direction being the same as the first direction; determining, by the one or more processors, a time at which to rotate the belt by the first distance in the first direction to divert the first item based on a sensor indicating that the first item is at the loading area for the one or more diverter arms; diverting the first item including rotating, by the one or more processors, the belt by the first distance in the first direction at the determined time; determining, by the one or more processors, an assigned chute to which to divert the first item based on the first instruction, the first direction being a direction of movement of an under-side of the belt from the first position of the belt toward the assigned chute; diverting, by the one or more processors, the first item into the assigned chute including rotating the belt by the first distance in the first direction; and that wherein determining the assigned chute to which to divert the first item includes selecting, by the one or more processors, the assigned chute from a pair of chutes including a first chute and a second chute, the first chute being located at a first end of a diverter mechanism and the second chute being located at a second end of the diverter mechanism, the diverter mechanism including the belt and the one or more diverter arms, the pair of chutes being radially located relative to the belt.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1:
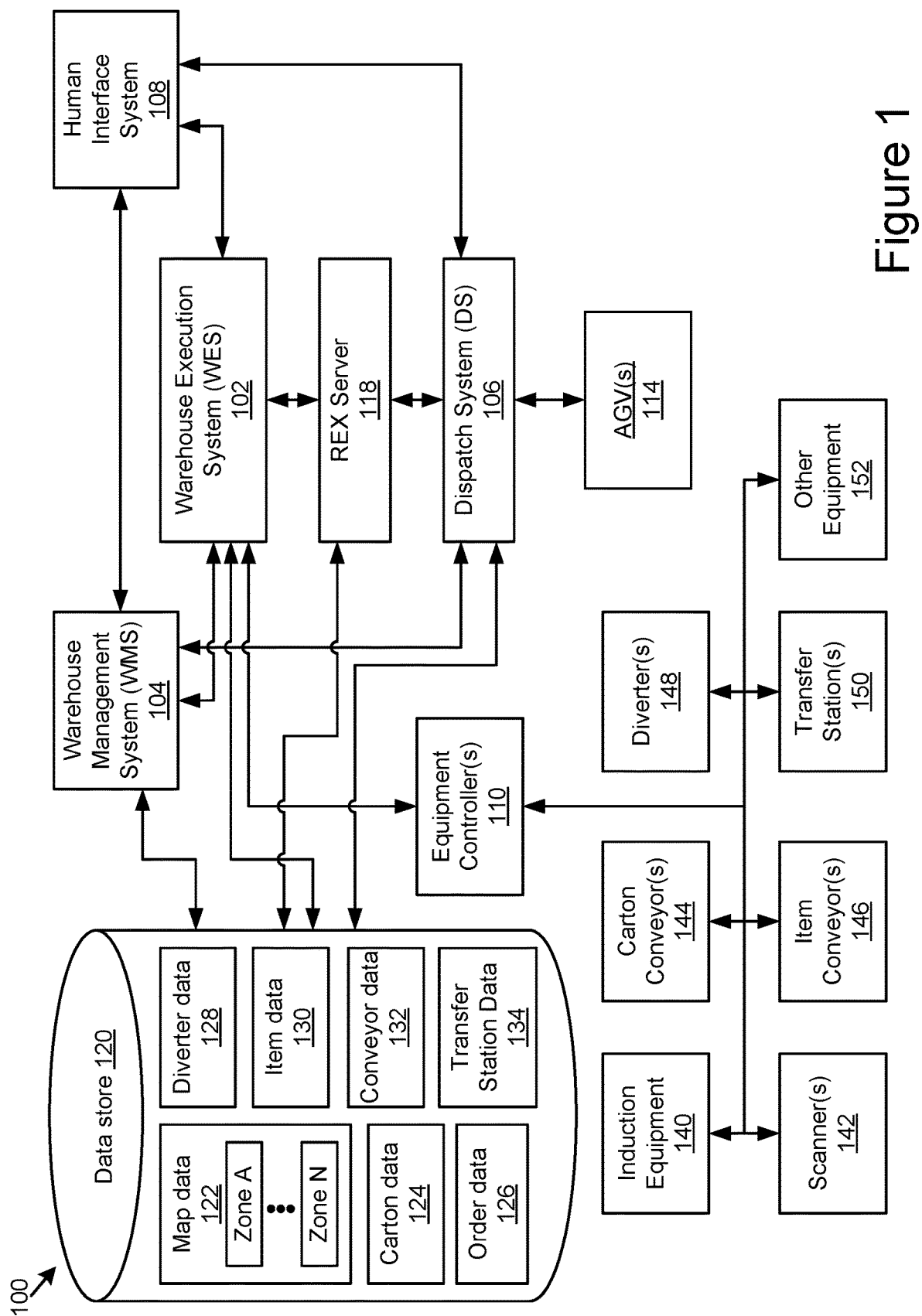
FIG. 1 depicts an example system and data communication flow for implementing an automated sorting and packing system.

The technology described herein relates to an automated sorting and/or packing system comprising various software and hardware devices. The technology also relates to an improved diverter mechanism that diverts items between conveyors, chutes, or other locations. The technology may include beneficial configurations, operations, features, and interactions. Among other benefits, the technology described herein improves upon that described in the Background Section. For instance, the technology provides robotic devices, systems, methods, and other aspects that can more efficiently process goods (e.g., items or items in a distribution facility).

Implementations of the technology include a belt-based diverter mechanism 250, which includes a motor for driving the belt (also referred to as a diverter belt herein) and one or more arms (also referred to as a diverter arm herein) coupled with the belt. For example, the belt may be a conveyor belt to which two arms or paddles 282 are coupled and from which they may extend. The arms may be coupled at an end of each arm to a surface of the belt, which rotates around one or more rollers or conveyor pulleys, so that as the belt is driven, the arms are driven in the same direction as, but extending from, the belt (e.g., around the closed loop formed by the belt). For example, the belt may be a conveyor belt mounted upside down above a diversion area from which an item may be diverted when a surface of the arm contacts the item, as described in further detail below.

As described herein, a diversion area, also referred to herein as a loading area, is an area from and/or to which items may be diverted by the diverter mechanism 250. For instance, a diversion area (whether moving or stationary) may be a location of an item conveyor 146 that a diverter arm or paddle 282 may contact to divert items from the item conveyor 146. A pushing surface of a paddle 282 may contact the item flatly (e.g., as the paddle 282 moves along a flat surface of a diverter belt 280) or at one or more varying angles (e.g., if the paddle 282 is moving around an edge of a diverter belt 280), depending on the implementation, as described below.

It should be noted that although a belt is described herein, implementations may use various materials or configurations that form a closed or nearly closed loop. For example, a belt may be or include a loop, band, or chain of material that is supported by one or more rollers, wheels, pullies, drums, or similar mechanisms to support and/or move the belt.

Beneficially, because a belt may be a closed loop, the diverter arms coupled with the belt may rotate with the belt (e.g., around the pulley(s)). In some implementations, where there are multiple diverter arms coupled with the belt, they may automatically reset to one or more starting positions, as described in reference to FIGS. 3A and 3B. For example, when a first arm moves to a left side under a conveyor, a second arm may move over the top of the conveyor to the right side. Accordingly, because the diverter arms may be instantly reset (e.g., by a next diverter arm moving into position) to a starting position, multiple items can rapidly be diverted to the same side. Additionally, in some implementations, the diverter belt may rotate in either direction, so items can be diverted in either direction toward either end of the diverter mechanism, as described below.

Accordingly, various implementations of improved diverter mechanisms 250 described herein allow rapid and accurate diverting of items. Furthermore, because items can be moved quickly and, potentially, in either direction, the size and configuration of sorting systems may be adapted and optimized. For instance, transfer stations, chutes, containers, etc., into which items may be diverted (e.g., from a loading or diversion area on an item conveyor belt) may be closely spaced together and located on both sides of the loading area, for example, as illustrated in the example environment of FIGS. 4A-4D. Similarly, because the diverter mechanism 250 may not have to return to a starting position to reset and may use quicker motors, a higher density of items may be diverted from a conveyor without necessarily stopping the item conveyor.

Depending on the implementation, the diverter mechanism 250 may include or be coupled to various other mechanisms. For example, a motor of the diverter mechanism 250 may include or communicate with a programmable logic controller (e.g., the equipment controller(s) 110 described below), which receives instructions for movement or positions of the belt and, therefore, the paddles 282 or diverter arms. The motor may include or the programmable logic controller may be coupled with a position sensor, such as an optical sensor that determines or confirms the locations of a belt, motor, pulley, and/or divert arm. In some implementations, a sensor coupled with the system may confirm diversion of an item, for instance, using the diverter mechanism 250.

The divert arm may be coupled with a frame, transfer stations, chutes, scanners, conveyors, AGVs, or other devices, for example, as described in more detail in reference to FIGS. 4A-4D.

Various implementations of diverters, their components, features, operations, and applications are described in more detail below.

Features of the technology described herein can be integrated into any logistics system, dispatch system 106, warehouse execution system 102, warehouse management system 104, a robot execution server 118, etc., to coordinate the operations of various systems, information, and devices in an automated sorting and packing system. The technology described herein may provide a fully or partially automated system that provides redundancy, reduces number of operations (e.g., by eliminating steps, avoiding transferring items between excess numbers of containers, etc.), and provides many other benefits described herein. The technology beneficially improves productivity and throughput, increases asset utilization, and lowers cycle time and labor costs. These benefits, in turn, lead to shorter delivery times and result in significant time and resource savings along with reduced error rates.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 depicts an example system 100 and data communication flow for implementing an automated sorting and packing system. The system 100 includes a warehouse execution system (WES) 102. The WES 102 is coupled to equipment 110, a warehouse management system (WMS) 104, a data store 120 storing various data, a human interface system 108 (e.g., pick-to-voice, pick-to-light, graphical user interface(s), etc.), a robot execution server (REX) 118, a dispatch system 106, and other systems. For instance, the system 100 may include induction equipment 140, scanner(s) 142, carton conveyor(s) 144, item conveyor(s) 146, diverter(s) 148, transfer station(s) 150, and other equipment 152.

The WES 102 may, in some implementations, include one or more hardware and/or virtual servers programmed to perform the operations, acts, and/or functionality described herein. The components of the WES 102 may comprise software routines storable in one or more non-transitory memory devices and executable by one or more computer processors of the WES 102 to carry out the operations, acts, and/or functionality described herein. In further implementations, these routines, or a portion thereof, may be embodied in electrical hardware that is operable to carry out the operations, acts, and/or functionality described herein.

For example, the WES 102 may be communicatively coupled with scanner(s) 142, carton conveyor(s) 144, item conveyor(s) 146, diverter(s) 148, and other equipment 152 either directly or via the equipment controller(s) 110, which may be programmable logic controllers (e.g., conveyor controllers, conveyor scanner controllers, automated induction equipment controllers, diverter controllers, other warehouse equipment controllers, or other computing devices for controlling equipment).

In some implementations, the WES 102 may receive, process, and transmit data to control software and hardware interactions, for example, by consolidating and controlling information across systems, as described herein. For instance, the WES 102 may serve as a decision point or control software that processes data streams for transfer station 150 allocation, item sorting, diverter mechanism 250 control or location, box induction, and other computations, as noted herein. For example, the WES 102 may communicate with equipment controller(s) 110 and/or other systems to perform operations described herein. The WES 102 may divert items and/or boxes into transfer stations 150, initiate the transfer of items into the boxes, and/or control other operations. One or more of these operations may be performed via communication with various equipment of the system 100, as described in further detail herein. Accordingly, the WES 102 may provide unified communication that coordinates various systems.

The WES 102 may communicate with various other systems and devices to perform its operations, as described herein, such as equipment controller(s) 110, induction equipment 140, scanner(s) 142, carton conveyor(s) 144, item conveyor(s) 146, diverter(s) 148, transfer station(s) 150, and other equipment 152. Induction equipment 140 may include an induction station (e.g., where items are placed on an item conveyor 146, such as an induction belt), box erectors, label applicators, scanners 142, picking equipment, or other devices for inducting items or cartons into the sorting system. Scanners 142 may include optical, radio, or other scanners or sensors that scan objects to identify the objects. In some implementations, the scanners 142 may determine locations of diverter belts 280 or diverter arms, confirm diversion of items, or other operations. Carton conveyors 144 may include one or more conveyors, such as conveyor belts or other devices that convey objects, such as shipping cartons, for example, between a carton induction point, transfer station 150, and/or end points (e.g., finalizing). Item conveyors 146 may include one or more conveyors, such as conveyor belts or other devices that convey objects, such as items or products, for example, between an item induction point, scan tunnel 450, transfer station 150, and/or end points (e.g., finalizing, item jackpot, etc.). While the carton conveyors 144 and item conveyors 146 may be different conveyors and/or types of conveyors, in some implementations, they may be the same conveyors and/or conveyor types. Diverters 148 may be diverter arms, diverter mechanisms 250, such as those described herein, pneumatic mechanisms, or other devices for diverting items and/or cartons for moving the items or cartons, for example, from conveyors into transfer stations 150. Transfer stations 150 may be devices for transferring items into cartons, for example, for example, transfer stations 150 may be located adjacent to item and/or carton conveyors 144. Other equipment 152 may include various other devices, such as label applicators, carton-closing equipment, control systems, printers, actuators, motors, etc. The devices 140-152 are described in further detail throughout this description.

The REX 118 may, in some implementations, include one or more hardware and/or virtual servers programmed to perform operations, acts, and/or functionality described herein. The REX 118 may generate a schedule that defines the route for an AGV 114 during a picking session. In some implementations, the dispatch system 106 instructs the AGV 114 to proceed through one or more of the zones of the distribution facility according to the schedule. The schedule of each of the AGVs 114 may be coordinated such that an optimal flow can be achieved.

In some implementations, the REX 118 or WES 102 may include or may communicate with a SKU (e.g., a stock keeping unit or unique identifier identifying an item) routing engine, which may route items into different storage zones depending based on picking profiles of the items, which may be stored and maintained as item data 130. The SKU routing engine may dynamically monitor picking activity in the distribution facility, track which items have the highest volume or velocity for a given timeframe, store the tracking data in the data store 120, and instruct the REX 118 to have items relocated by AGVs, conveyors, and/or diverters to different locations in the distribution facility based on the tracked activity.

The dispatch system 106 may be electronically communicatively coupled to a plurality of automated guided vehicles (AGVs) 114. In some implementations, the dispatch system 106, or elements thereof, may be integrated with or communicatively coupled with the REX 118. The dispatch system 106 includes hardware and software configured to dispatch the AGVs 114 and is coupled for communication the components of the system 100 to receive instructions and provide data. The dispatch system 106 may calculate a route to execute the task considering traffic and resources. In some cases, it adjusts the route or the task in order to make the route efficient.

The AGVs 114 are robotic vehicles including drive units providing motive force for moving the AGVs (and, in some instances, carts, storage units, etc.), guidance systems for determining position of the AGVs 114 within the distribution facility, and equipment for carrying items. Some AGVs 114 may be attached to, include, or carry carts, which, in turn, carry items.

The WMS 104 may, in some implementations, include one or more hardware and/or virtual servers or software routines storable in one or more non-transitory memory devices and executable by one or more processors to perform the operations, acts, and/or functionality described herein. The WMS 104 may be configured to store and maintain data in the data store 120. In some implementations, the WMS 104 may be configured to communicate with the WES 102, the human interface system 108, dispatch system 106 and/or other systems in real time, in batches, as requested by these components, etc. For example, the WMS 104 may receive order data from an e-commerce or other server, process the data, and update various data in the data store 120 based on the order data. Similarly, the WMS 104 may detect and update inventory and other data.

The human interface system 108 may, in some implementations, include one or more hardware and/or virtual servers or software routines storable in one or more non-transitory memory devices and executable by one or more processors to perform operations, acts, and/or functionality for providing interfaces and interacting with humans. The human interface system 108 may provide instructions and/or receive pick confirmations, for example, from pickers or operators (e.g., using barcode scanners, NFC, RFID or radio-frequency identification chips, or other sensors or input methods) working within a pick zone confirming that picks for a given carton have been performed, as described in further detail below. An example human interface system 108 may include a pick-to-voice, pick-to-light, or graphical user interface system. The human interface system 108 may be configured to communicate the pick confirmation data with the WES 102, WMS 104, or other components of the system 100 in real time, in batches, as requested by the components of the system, etc.

The human interface system 108 may receive confirmatory input (e.g., pick confirmations) from pickers. The confirmatory input confirms that certain operations have been completed. The human interface system 108 transmits the confirmatory input to the WES 102. The confirmatory input may include the time stamp reflecting completion of the operations, a unique identifier identifying the picker (e.g., an operator or human agent), a unique identifier identifying the pick zone, a unique identifier identifying an item, and/or a unique identifier identifying the carton.

The data store 120 is an information source for storing and providing access to data. The data stored by the data store 120 may be organized and queried using various criteria including any type of data stored by it. The data store 120 may include data tables, databases, or other organized collections of data. An example of the types of data stored by the data store 120 may include, but is not limited to map data 122, carton data 124, order data 126, diverter data 128, item data 130, conveyor data 132, transfer station data 134, etc. In some instances, the data store 120 may also include conveying system attributes, picking data, agent attributes, sensor data, etc.

The data store 120 may be included in the WES 102, WMS 104, REX 118, or in another computing system and/or storage system distinct from but coupled to or accessible by the WES 102, WMS 104, REX 118, or other components of the system 100. The WES 102, human interface system 108, REX 118, and/or dispatch system 106, for example, may store and maintain data in the data store 120. The data store 120 can include one or more non-transitory computer-readable mediums for storing the data. In some implementations, the data store 120 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate (e.g., insert, query, update and/or delete) rows of data using programmatic operations.

The map data 122 may include data reflecting the 2- or 3-dimensional layout of the facility including the location of storage units, picking areas, lanes, equipment, storage shelving units, items, AGVs 114, conveyors, diverters 148, transfer stations 150, etc. Map data 122 may include the locations of diverter mechanisms 250, loading or diversion areas, locations to which items may be diverted using diverters, etc. Map data 122 may indicate the attributes of the distribution facility, including attributes of zones of a warehouse. For example, attributes of zones may include the number, quantity, and location of shelving units or bays, storage units, items, guidance system locators or markers, etc.

The carton data 124 may include information about cartons and/or containers in the system, such as a unique identifier or license plate number for each carton or container, a carton or container type, the zones a carton will visit, the number of pick lines a carton proceeds through, and the priority for the carton. The carton data 124 may include a picklist defining the items the carton will contain. The carton data 124 may include size or configuration of a carton, associated transfer station 150, or other details.

The order data 126 includes data about orders, items picked, items to be picked, picking performance, confirmations, locations of items, etc. Order data 126 may indicate the quantity and identity of items in orders, shipping addresses, order priority, progress of order fulfillment, number of cartons in an order, sub-orders when and order is split into multiple cartons, etc.

The diverter data 128 may describe the state of a diverter (operational state, health, location, battery life, storage capacity, items being diverted, cartons, etc.) or its position, speed, number or position of diverter arms, belt position, confirmation data, etc.

The item data 130 may describe items or objects in a distribution facility. The item data 130 may include unique identifiers for these items, the item volume (e.g., the total amount picked in given window (e.g., in an hour, day, etc.)), the item velocity (e.g., number of different times item picked in given window (e.g., per hour, day etc.), the location of the items within the distribution facility (aisle, shelf, shelf position, etc.), other attributes of the item (e.g., size, description, weight, quantity of items in a package, color, etc.), item inventory, or mapping of items to storage units, orders, conveyor locations, transfer stations 150, etc. In some implementations, the item data 130 may include the quantity of particular items a storage unit contains, the current location of a storage unit, a storage location of items and/or storage units, and other data. For instance, the item data 130 may include visual aspects, labels, QR codes, identifying markers, etc., that may be used by the WES 102 or equipment controller(s) 110 to identify items, for example, based on a scan of an item.

The conveyor data 132 may include various data pertaining to the conveyors 144 and 146, for example. For example, the conveyor data 132 may describe the state of a conveyor 144 or 146, such as the location, speed, operational state, health, capacity, attributes, items being carried, cartons, or other data.

The transfer station data 134 may include various data pertaining to the transfer station(s) 150, such as the state of each transfer station 150, such as its location, speed, operational state, health, capacity, attributes, item(s) in or assigned to the transfer station 150, order(s) assigned to the transfer station 150, cartons in or assigned to the transfer station 150, or other data.

The components of the system 100 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth, NFC, etc.), etc. In some implementations, one or more of these components may be coupled via a data communications bus.

Example diverters 148 and transfer stations 150 that allow the close proximity and rapid sorting are described in further detail below. It should be noted that other configurations are possible and contemplated. For instance, although an example layout and quantity of transfer stations 150 are shown, they may be different in number, layout, or configurations.

In some implementations, one or more items may be diverted into a transfer station consolidation area 426 of a transfer station 150 and a carton may be transferred into a carton receiving area 422 of the transfer station 150. The transfer station 150 may then be instructed, by the WES 102 to transfer the item(s) into the carton, as described elsewhere herein. A diverter 148 for transferring items from an item conveyor 146 may be a paddle-conveyor system (e.g., the diverter mechanism 250), or other devices, as described in further detail below.

Figure 2A:
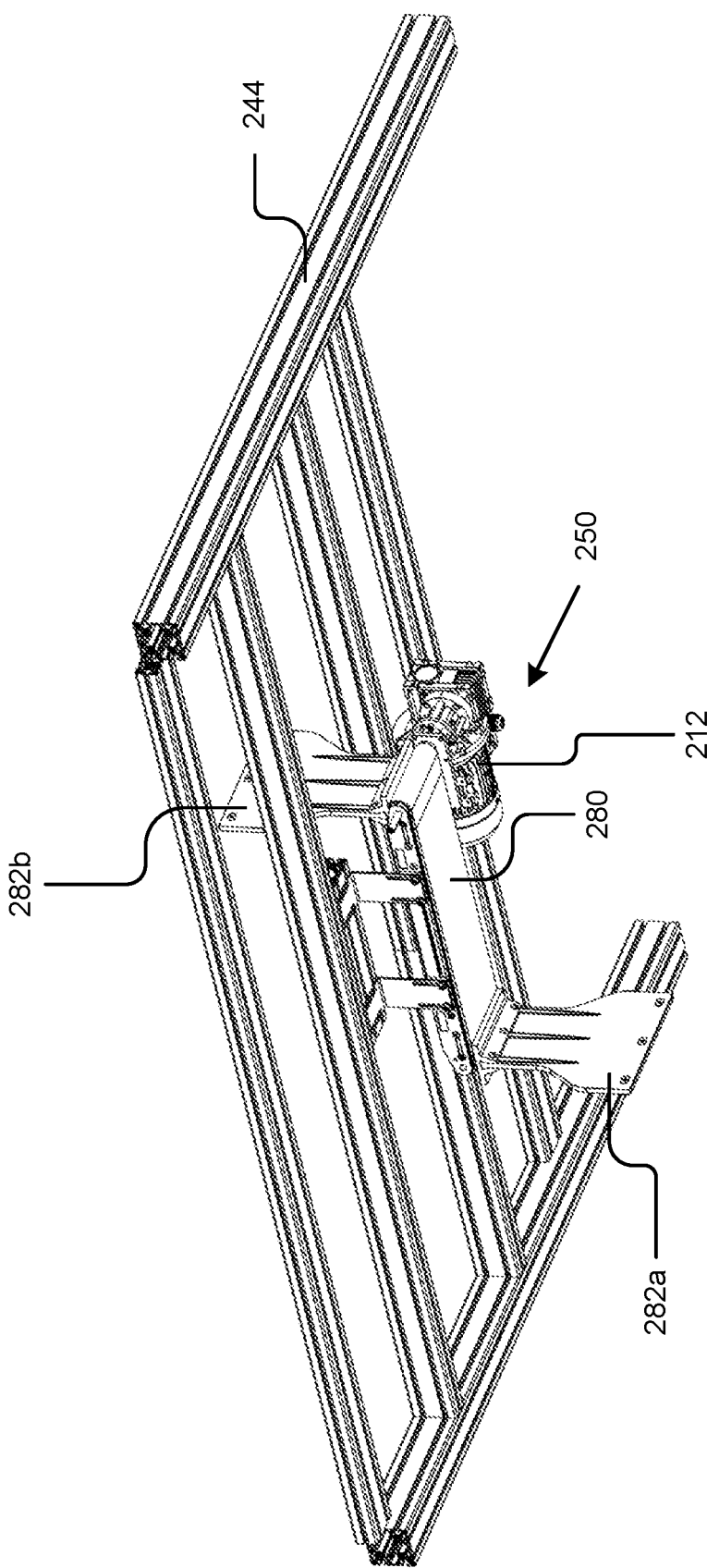
FIGS. 2A-2D illustrate an example diverter mechanism mounted to a mounting mechanism.
Figure 2B:
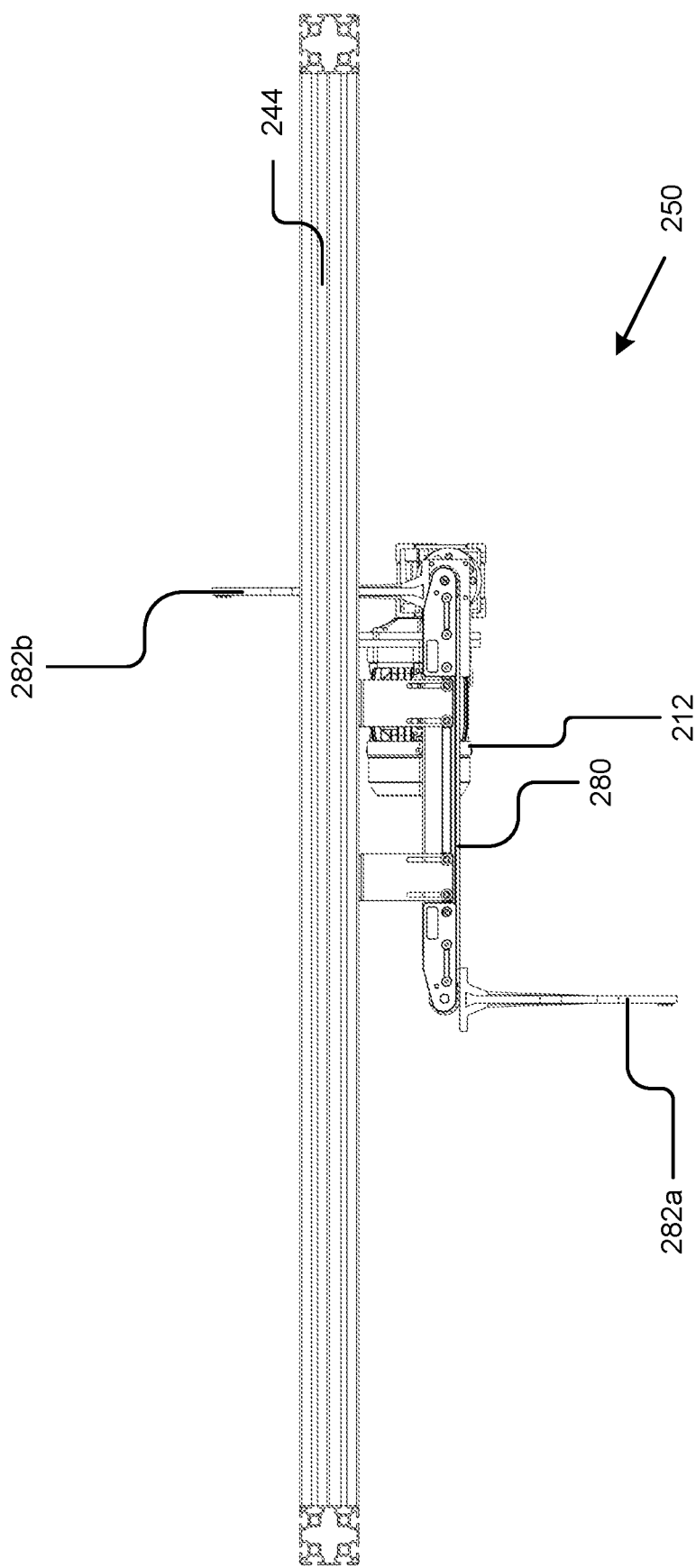
Figure 2C:
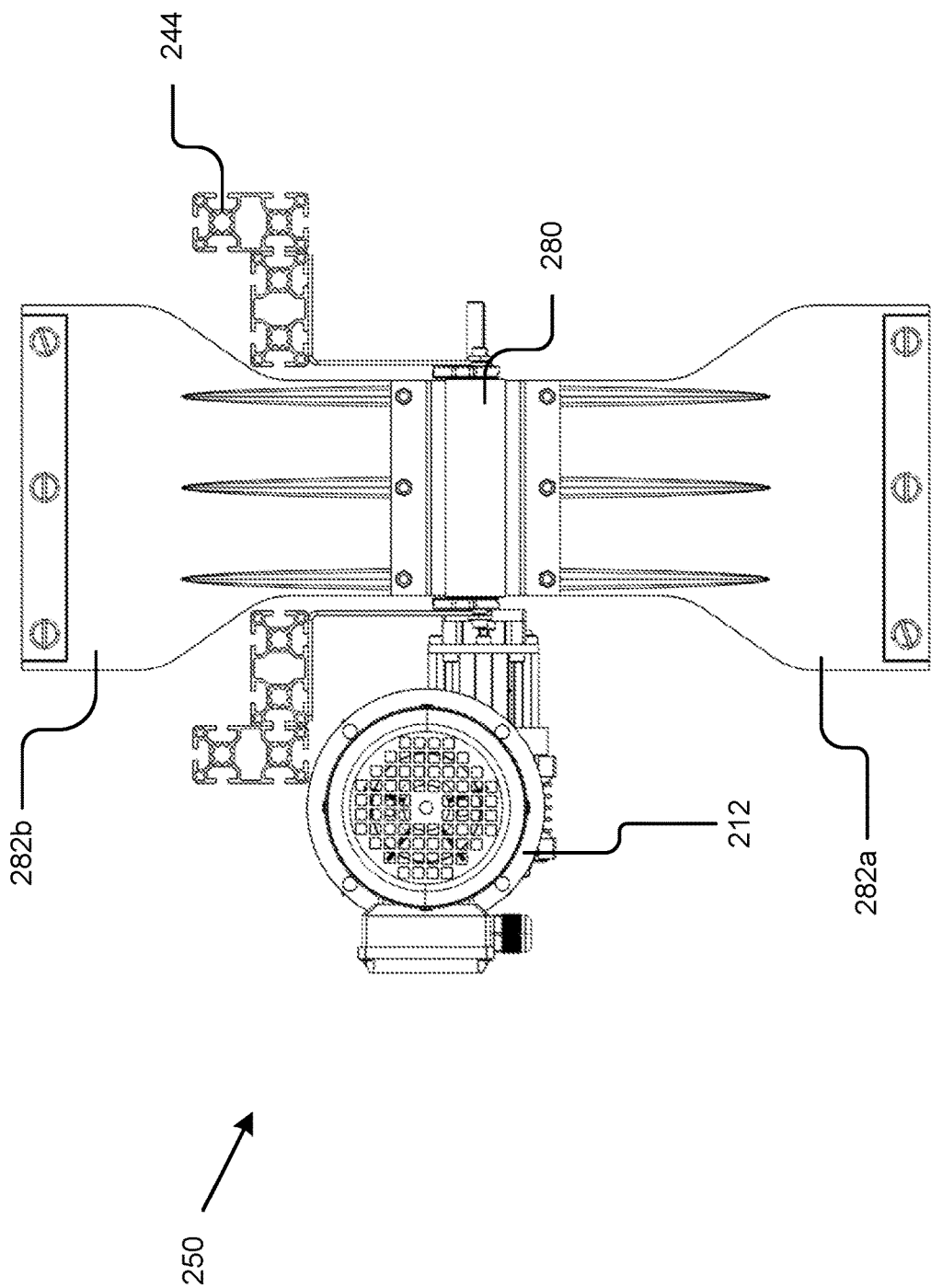
Figure 2D:
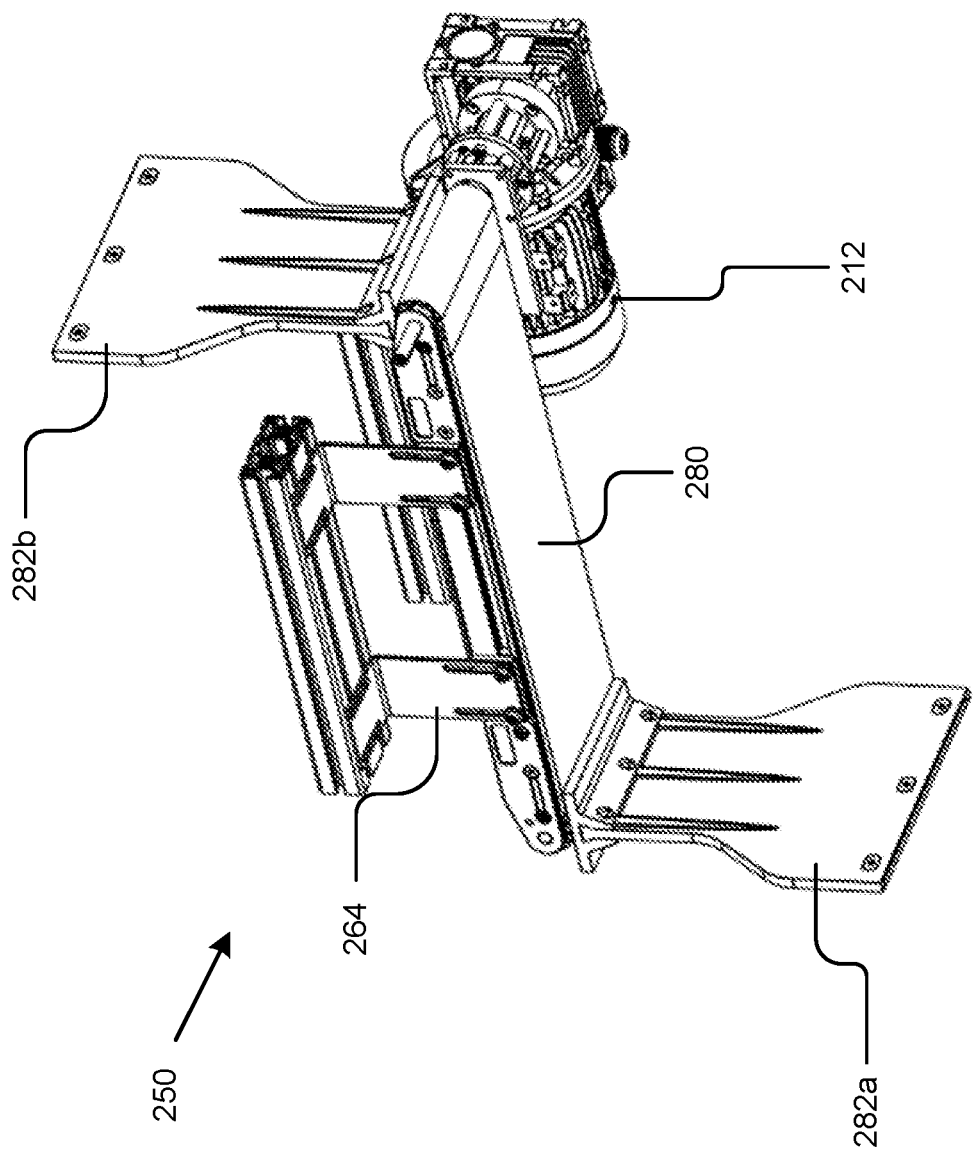

FIGS. 2A-2D illustrate an example diverter mechanism 250 mounted to a mounting mechanism, such as a frame 244. FIG. 2A illustrates a bottom perspective view of an example diverter mechanism 250 mounted to an example frame 244. FIG. 2B illustrates a side view of an example diverter mechanism 250 mounted to an example frame 244. FIG. 2C illustrates an end view of an example diverter mechanism 250 mounted to an example frame 244. FIG. 2D illustrates a bottom perspective view of an example diverter mechanism 250 with an example mount 264.

As illustrated in the example of 2A-2D, the diverter mechanism 250 may include a diverter belt 280 with diverter arms, which may be or paddles 282*a* and 282*b* or other extensions mounted to the belt. The WES 102 or equipment controller(s) 110 may rotate the diverter belt 280 (also referred to herein as a diverter belt 280), thereby rotating the paddles 282*a* and 282*b*, one of which may contact an item and push it sideways (e.g., toward an end of the diverter mechanism 250) into either of two transfer stations 150 (e.g., as illustrated in FIG. 4C). As illustrated in the example of FIG. 2A, the frame 244 may be open above the diverter belt 280, so that the paddles 282 may pass completely or partially over the top of the diverter belt 280 without contacting the frame 244. Accordingly, as the diverter belt 280 rotates the paddles 282, they may push items below the belt 280 in either direction based on the rotation of the diverter belt 280.

Figure 3A:
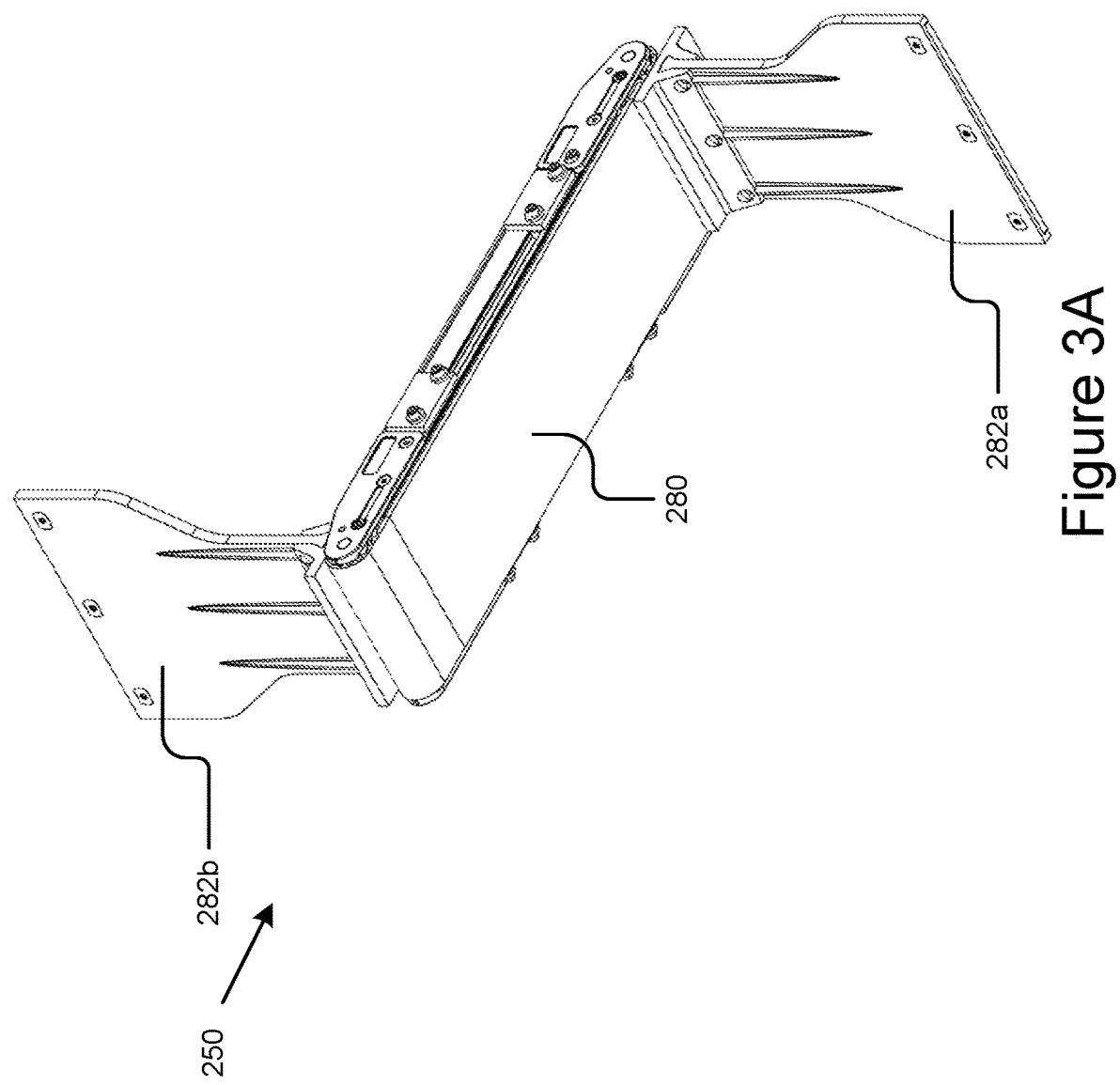
FIGS. 3A and 3B illustrate various views of an example diverter mechanism.
Figure 3B:
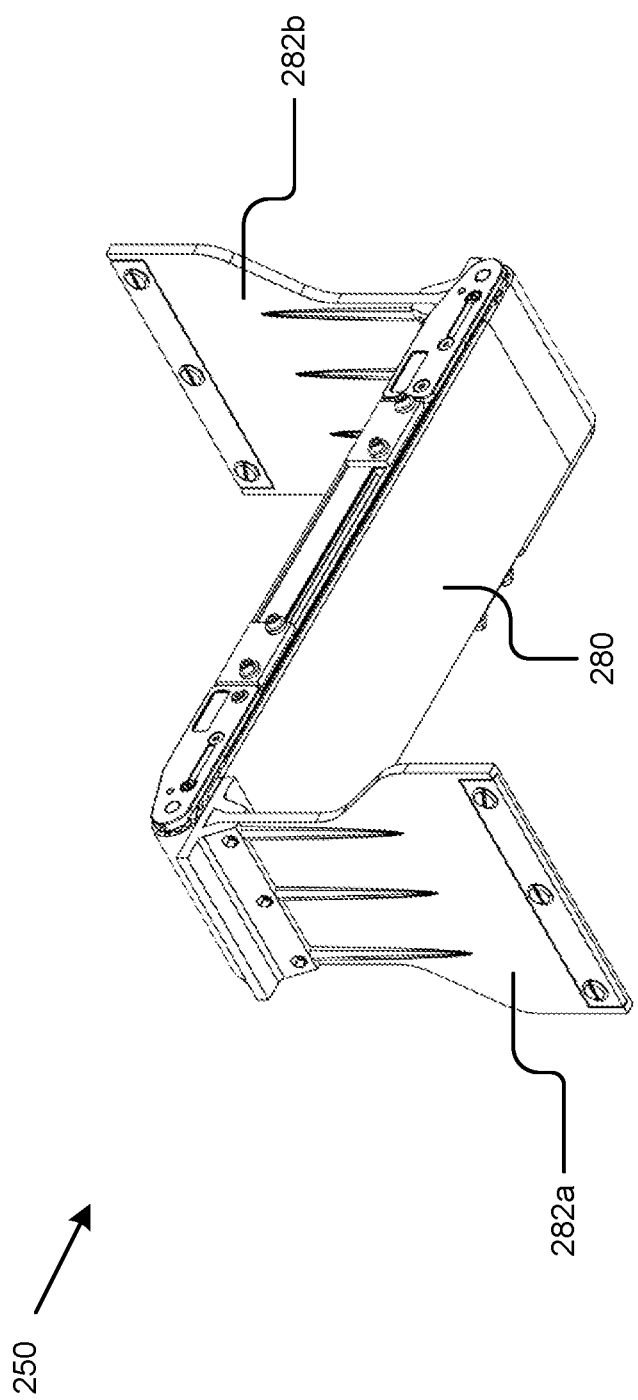

In implementations where there are multiple paddles 282, a subsequent paddle 282 may automatically rotate into a position where it is ready to quickly divert a subsequent item from the item conveyor 146 in either direction, as described in reference to FIGS. 3A and 3B. The diverter belt 280 may be coupled with a motor 212 that provides precise and quick positioning and movement of the belt 280 and, thereby, the paddles 282.

Various configurations of the diverter mechanism 250 provide a simple, inexpensive, and robust diverter that provides numerous benefits over other solutions, as noted above. For example, the example configurations of the diverter mechanisms 250 allow the paddle(s) 282 to automatically reset to push a subsequent item in either direction, thereby substantially increasing throughput and density of items that can be diverted from an item conveyor 146 over other diverters, such as pneumatic rams.

Figure 3C:
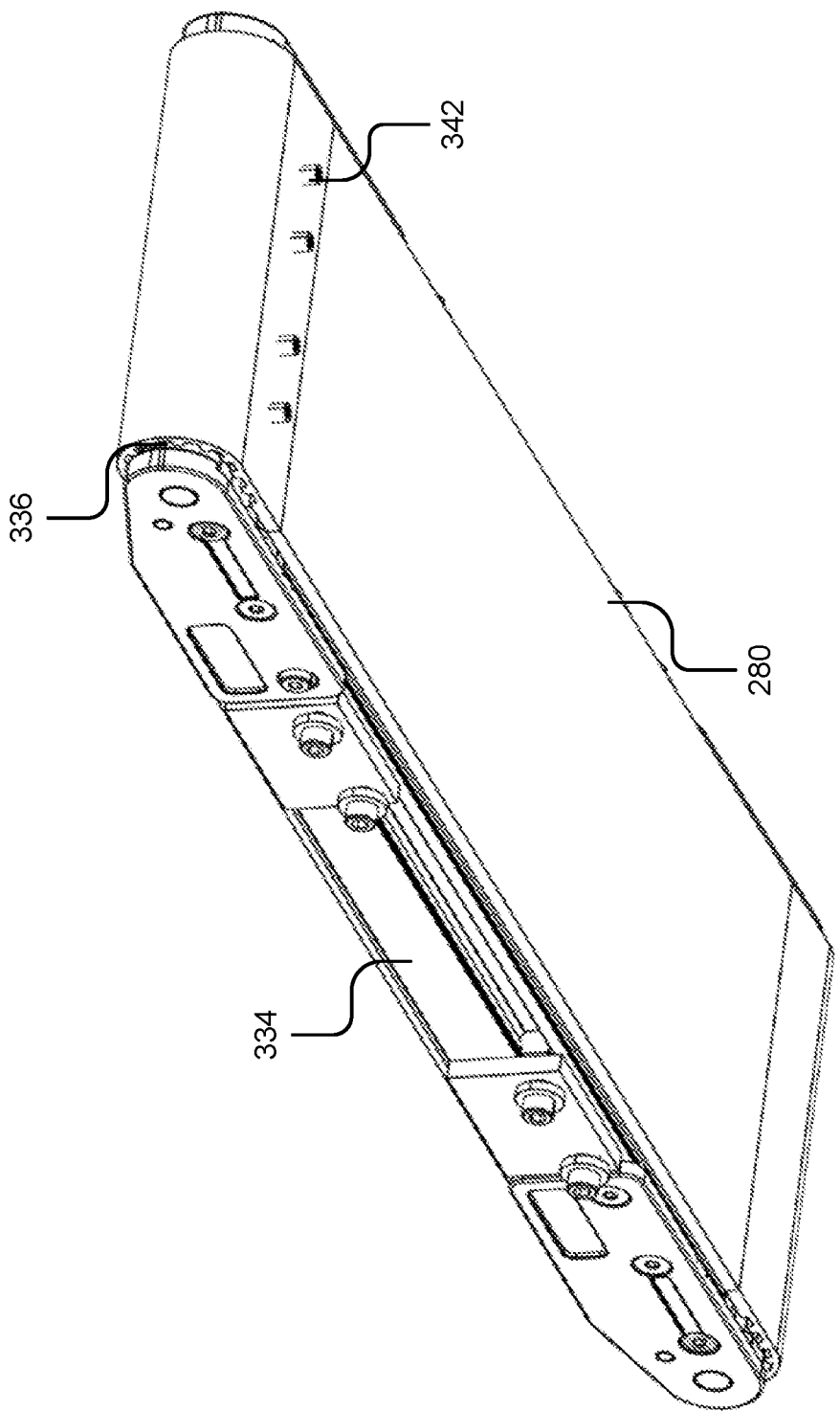
FIG. 3C illustrates an example diverter belt.

A belt 280, which is described in further detail in reference to FIG. 3C and elsewhere herein, may be a closed loop of material that may be rotated around one or more drums, pulleys, driveshafts, or rollers, etc. In some implementations, the belt 280 may not be a closed loop while using other operations, features, and devices described herein. If the belt is not a closed loop or cannot be rotated continuously around the pulley(s), it may be completely or partially reset to a starting position to divert items.

The belt 280 may include a motor-driven belt with one or more arms or paddles 282 coupled thereto. The belt 280 may be a conveyor belt that is mounted next to or, for example, upside down above a diversion or loading area, such as on an item or carton conveyor 144 or 146, as illustrated in FIGS. 4A-4D. The motor 212 may drive the belt 280 in one or both directions to push items, while effectively simultaneously resetting one or more arms or paddles 282 to push in one or both directions. Sensors on the motor(s) 212, belt, arm(s), and/or externally may detect the position of the belt/paddles 282 or movement of the item.

The diverter mechanism 250 may include one or more diverter arms, such as paddles 282 or protrusions, that are coupled to the belt 280 and extend therefrom. Although these are referred to as paddles 282 herein, they may include various devices and configurations that extend from a belt 280 to contact and exert a force onto objects to divert the objects. The paddles 282 are described in further detail elsewhere herein, for example, in reference to FIG. 3F.

The diverter mechanism 250 may include a motor 212, which is coupled with the diverter belt 280, for example, via a drum, roller, driveshaft, gear, wheel, pulley, or similar device that causes the diverter belt 280 to rotate. For instance, the diverter mechanism 250 may include a drive pulley on a first end and an idler pulley at a second end for supporting and rotating the diverter belt 280, as described in reference to FIG. 3C.

In some implementations, the motor 212 may be a precision motor, stepper motor, or another actuator that accurately and quickly rotates the diverter belt 280. For instance, the diverter mechanism 250 may use servo motors and drives that accurately start and stop. In some implementations, the motor 212 may be coupled with the diverter belt 280 (e.g., a pulley thereof) using gears, belts, driveshafts, transmissions, chains, or other coupling mechanisms.

In some instances, the motor 212 may include sensors that determine a speed and/or position of the diverter belt 280 and/or paddles 282. For instance, the motor 212 of the diverter mechanism 250 may be coupled to a programmable logic controller, such as the equipment controller(s) 110, that determines positions, speeds, or statuses of the diverter mechanism 250. The equipment controller(s) 110 may also be coupled with one or more scanners or sensors that determine the positions, speeds, or statuses of the diverter mechanism 250 or objects. For instance, the equipment controller(s) 110 may be coupled with an optical sensor that uses computer vision, photo eyes, or beam-break sensors to detect motion and/or position of one or more components of the diverter mechanism 250 or diverted/divertable objects. Additionally, or alternatively, the sensor(s) may include weight, resistance, contact, hall-effect, or other sensors that detect the position or movement of a component of the belt or paddles 282. The sensors may be a primary method of determining the position or movement, or they may be used to verify or calibrate the position/motion data of the motor(s) 212. Accordingly, an accurate position of the paddles 282 may be determined and used, as described below.

The equipment controller(s) 110, or other programmable logic controllers, as noted above, may be communicatively coupled with the WES 102 or other components of the system 100 to send and receive instructions, positions, confirmation details, or other messages therewith.

In some implementations, the diverter mechanism 250 may include or be communicatively coupled (either directly or via equipment controller(s) 110 or the WES 102) with scanners 142 or other sensors that detect items in a loading or diversion area. For instance, the loading area may be a two or three-dimensional area that is stationary, stationary above an item conveyor 146, or moving with an item conveyor 146. A diverter arm may contact the item in the loading area to move the item therefrom. For example, the sensor may detect a presence of an item, a scanner may identify a specific item, and/or the WES 102 may use an item conveyor 146 position along with sensor/scan data to determine when to divert an item. For example, as described herein, diverting an object may include moving the object, whether the object is stationary or currently otherwise moving (e.g., on an item conveyor 146).

As illustrated in FIG. 2A, for example, the diverter mechanism 250 may be mounted to a frame 244. Although other implementations are possible and contemplated herein, the frame 244 may be coupled with an item conveyor 146, carton conveyor 144, transfer station(s) 150, or other stands or mounting points. As illustrated, the frame 244 may include an opening, aperture, channel, or other location above the diverter belt 280 that allows the paddles 282 to pass over the top of the diverter belt 280. For example, as illustrated, the frame 244 may be constructed from aluminum extrusions to which the diverter mechanism 250 may be coupled.

For example, as illustrated in FIG. 2D, the diverter mechanism 250 may be coupled with one or more brackets and other mounting devices 264 that couple the diverter mechanism 250 to the frame 244 or other mounting point. For instance, as illustrated in the example of FIG. 2D the diverter mechanism 250 may be coupled with a frame using brackets, such as L-brackets that securely mount the diverter mechanism 250 (e.g., with the diverter belt 280, paddles 282, and motor 212). The brackets 264 may be adjustable to change the height, rotation, or horizontal position of the diverter position, so that it properly interacts with the items in a diversion or loading area.

It should be noted that although the diverter mechanism 250 is illustrated mounted horizontally from above a loading area, other implementations are possible and contemplated herein. For instance, the diverter mechanism 250 may be mounted on its side horizontally or vertically, or in other configurations.

The example diverter mechanism 250 is illustrated and described in further detail below, for example, in reference to FIG. 3A-3B. It should be noted that although an example diverter mechanism 250 is illustrated and described, other types of diverters, such as pneumatic or robotic arms, specialized conveyors, movable walls, etc., are possible and contemplated herein.

FIGS. 3A and 3B illustrate an example diverter mechanism 250 with a diverter belt 280 and two paddles 282a and 282b (e.g., located opposite to each other around a circumference of the belt 280). FIGS. 3A and 3B omit conveyor motors 212, mounting mechanisms 264, and frames 244 to illustrate the diverter belt 280 and paddles 282 more clearly. The diverter mechanism 250 may physically push items into transfer stations 150, chutes, onto conveyors, etc., for example, a diverter belt 280 may translate a contact or pushing surface of a paddle 282 perpendicular to a direction of movement of an item conveyor 146 thereby contacting an item on the item conveyor 146 and moving it into a transfer station 150.

Depending on the implementation, the diverter mechanism 250 may include one, two, three, or more arms or paddles 282. Each paddle 282 may be attached at an end of the paddle 282 to the diverter belt 280, as illustrated, for example, using a bracket or brace that increases the strength of the connection as described in reference to FIG. 3E.

Figure 3D:
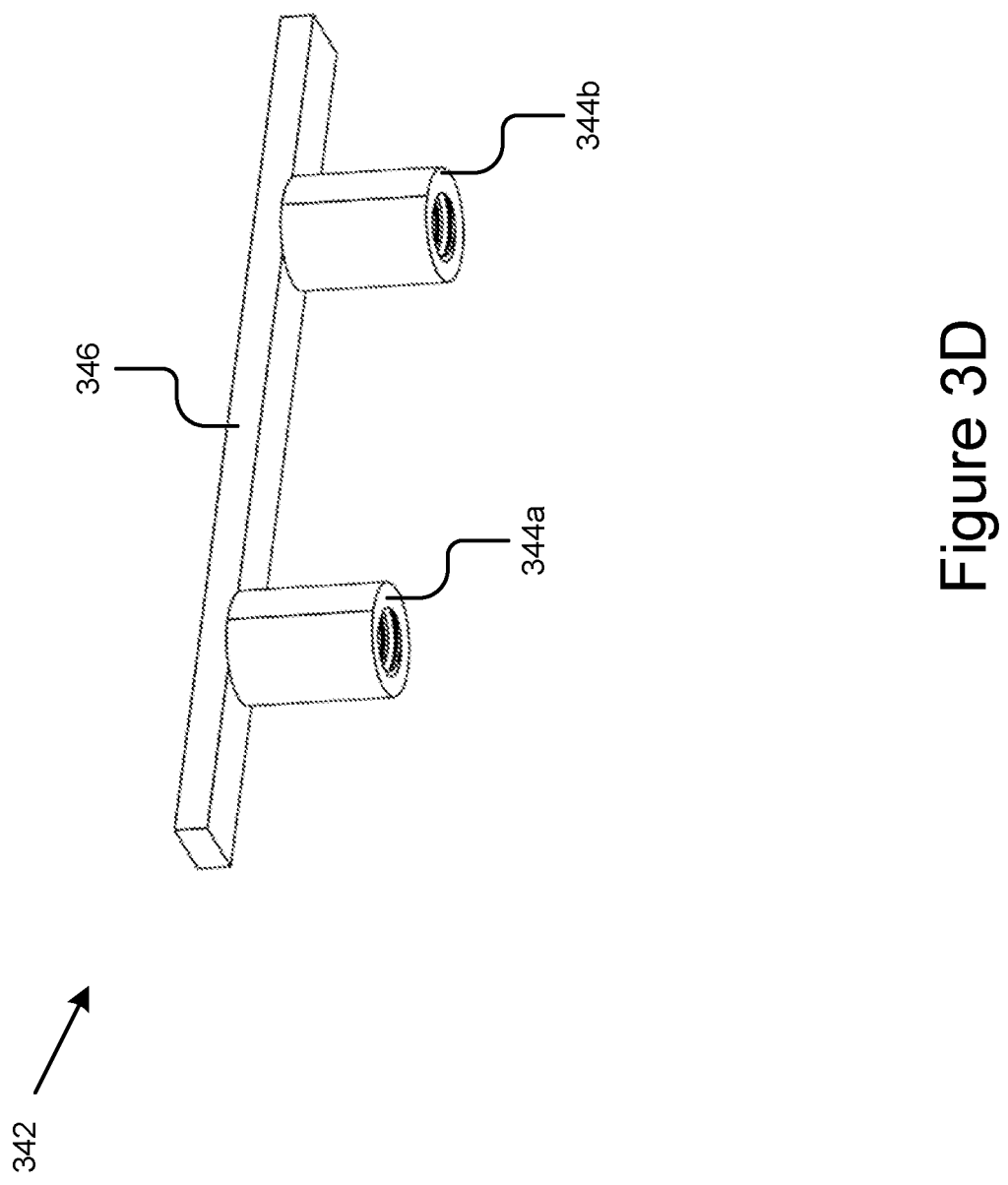
FIG. 3D illustrates a perspective view of an example threaded insert.
Figure 3E:
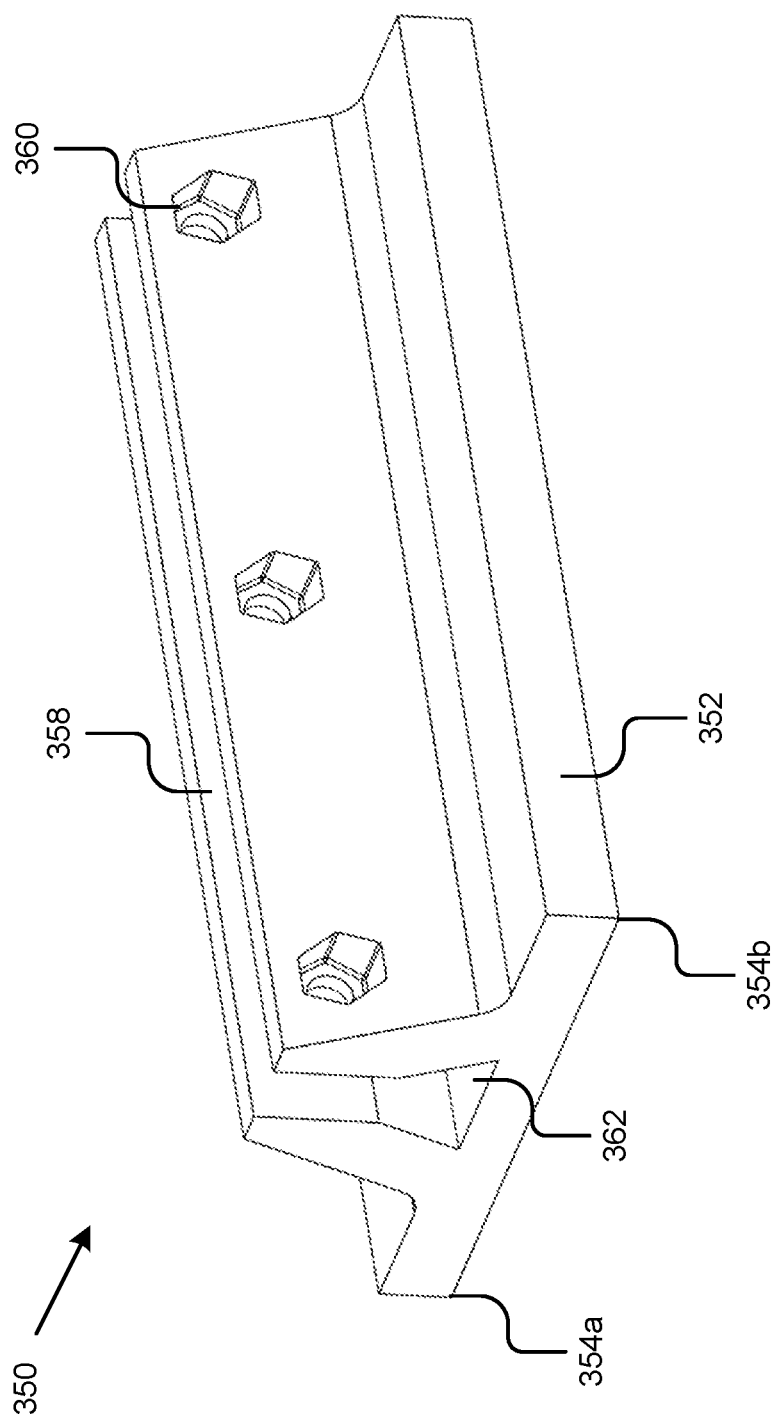
FIG. 3E illustrates an example paddle-mounting bracket.
Figure 3F:
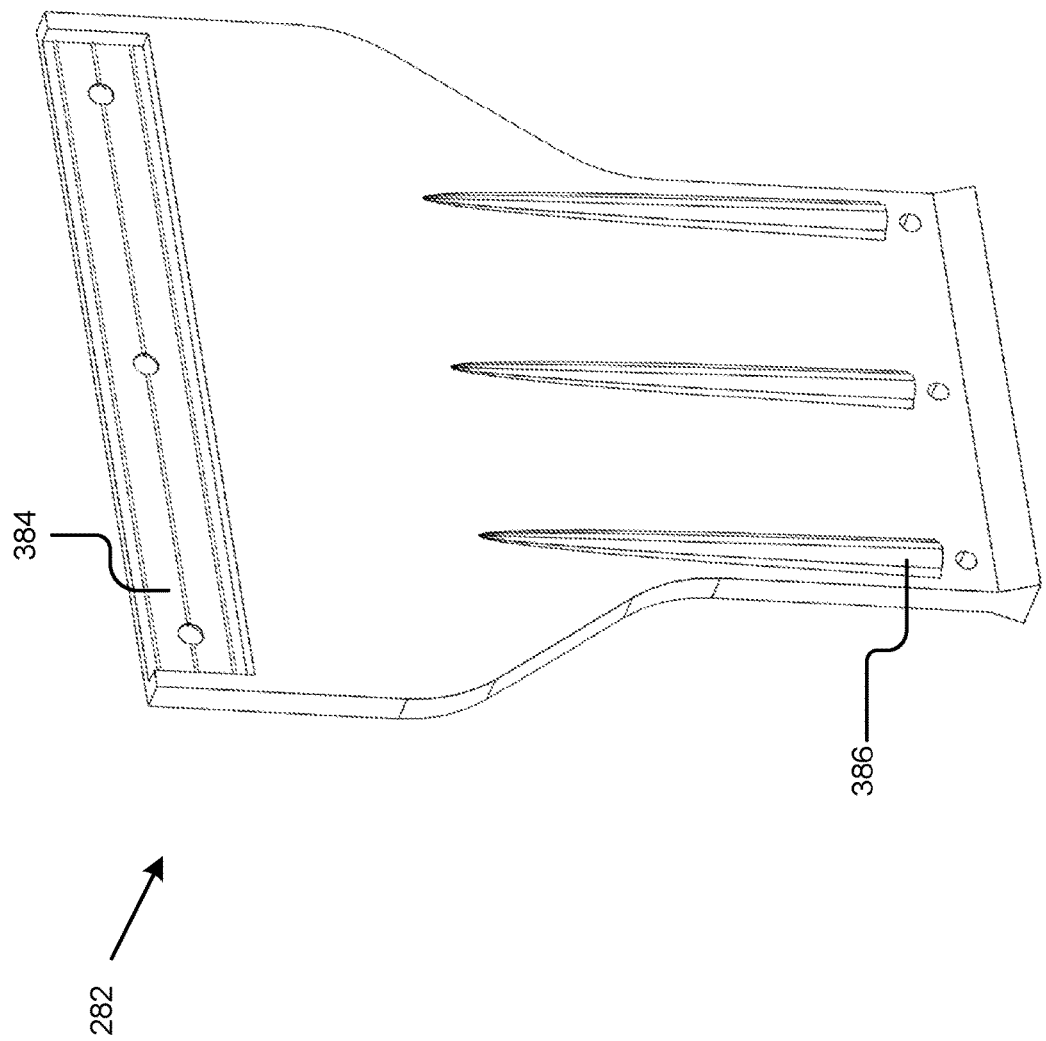
FIG. 3F illustrates an example diverter paddle.

As illustrated and described in further detail in reference to FIG. 3F, a paddle 282 may have a width at the connection with the belt to match a width of the belt and a width at an opposing end of the paddle 282, which is wide enough to contact a variety of sizes of items on the item conveyor 146 or based on a variety of speeds at which the items may pass the paddle 282 on the item conveyor 146.

The example diverter mechanism 250 may allow two items in a row to be transferred from an item conveyor 146 into the same transfer station 150 or chute because, when a first paddle 282a moves across the diverter belt 280, a second paddle 282b may automatically move into position (e.g., a starting position ahead of the loading area) in order to push a second item in the same direction. For example, as illustrated in the transition from FIG. 3A to FIG. 3B, a first paddle 282a may move to the left (in the figures) from the position illustrated in FIG. 3A to the position illustrated in FIG. 3B. At the same time, the diverter belt 280 moves the second paddle 282b across the top of the diverter belt 280 thereby effectively resetting the second paddle 282b to push an item in the same direction. Accordingly, there is a paddle 282 at both ends of the diverter belt 280, so the diverter mechanism 250 can immediately push an item in either direction (e.g., by using either paddle 282) by rotating the belt 280.

In some implementations, the continuous movement of the diverter belt 280 simultaneously over the top and the bottom of the diverter mechanism 250 in opposing directions causes paddles 282 on opposing ends/sides of the diverter belt 280 to move in opposite directions (e.g., one on the top and one on the bottom), thereby resetting the paddles 282 to push items in either direction. For instance, at the start and end of movement, there may be a paddle 282 at each end of the diverter mechanism 250 so movement of the diverter belt 280 in either direction causes a paddle 282 to move across the diversion or loading area in a corresponding direction.

It should be noted that although two paddles 282 are illustrated in the examples of FIGS. 2A-3B, other implementations are possible. For instance, the quantity of paddles 282 may be varied based on the length of the diverter belt 280 or its configuration. For example, where the diverter belt 280 is circular (e.g., on a wheel or single pulley) a single arm or paddle 282 may be used. Where the diverter belt 280 and/or diverter mechanism is longer (e.g., an elongated diverter mechanism is illustrated in FIG. 3C) or a diversion/loading area is wider, three or more paddles 282 may be used, so that there is a paddle 282 ready at one or both sides of a diversion or loading area to divert an item in one or both directions.

FIG. 3C illustrates an example diverter belt 280, for example mounted to conveyor pulleys and an associated support structure 334 for keeping the pulleys at a certain distance, providing support, and/or adjusting tension of the diverter belt 280.

The diverter belt 280 may be various types of belts or similar mechanisms. In some implementations, the diverter belt 280 may be a closed loop of material, such as a band, strap, chain, rigid hinged segments, ring, ribbon, mesh, or another construction. The diverter belt 280 may be constructed of rubber, metal, cloth, or another material.

The diverter belt 280 may have various thicknesses, widths, or lengths depending on the size of object being diverted, available space, or other constraints. The diverter belt 280 may have various lengths or diameters of rotation (e.g., based on pulley or roller size) to accommodate various widths of item conveyors 146. For example, in instances where a diverter belt 280 is mounted upside down above an item conveyor 146, a length of the diverter belt 280 may correspond to a width of the item conveyor or otherwise to the loading area. For instance, if an item conveyor 146 is wider or if a chute is farther away, the diverter belt 280 may be longer, so that the paddle 282 moves farther or more flatly (e.g., along a flat side of the diverter belt 280) for a longer distance.

The diverter belt 280 may include a precise geared drive that moves at a high rate of speed, to move items quickly and accurately for circumstances where the item is continuously or intermittently moving on an item conveyor 146. For example, as described above, the diverter belt 280 may be coupled with a controllable motor 212 and/or gears to drive a drive pulley.

The diverter mechanism 250 may include one or more pulleys 336, drums, gears, wheels, or other devices for providing support to the belt. For instance, although not separately shown in FIG. 3C, the diverter belt 280 may be or include a round wheel or elongated loop of material to which diverter arms or paddles 282 may be coupled. The belt 280 may pass over one or more pulleys 336 or rollers, which provide support and may impart motion to the diverter belt 280.

In some implementations, the belt 280 may include holes into which an end of a paddle 282 may attach (e.g., using fasteners, such as bolts), for example, the holes may include threaded inserts embedded into the belt(s) 280 for receiving fasteners. For example, as illustrated in FIG. 3C, the diverter belt 280 may include or have coupled thereto threaded inserts 342, which may be in rows at points where diverter arms or paddles 282 may be attached (e.g., using a mounting bracket 350, as illustrated in FIG. 3E). For example, the diverter belt 280 may include holes through which threaded inserts 342 may be placed. A diverter arm and/or mounting bracket 350 may mate with the threaded inserts to secure the diverter arm to the belt 280.

FIG. 3D illustrates a perspective view of an example threaded insert 342. For example, one, two, or more inserts may be inserted through holes in the diverter belt 280 to provide a strong connection to a diverter arm/paddle 282. For instance, the threaded inserts 342 may include one or more threaded portions or bolts coupled with a washer or flat area. In the illustrated example, two threaded portions 344a and 344b are coupled with a bridge 346 that mounts on an inner surface of the diverter belt 280. For instance, the bridge 346 may contact the back of the diverter belt 280 to prevent the threaded portions 344 from pulling through the diverter belt 280. Various constructions, shapes, configurations, and materials may be used for the threaded insert 342, for example, it may be constructed from various types of metals, have various shapes, or other configurations.

Accordingly, a hole pattern in the diverter belt 280 may be a straight line with several (e.g., 3, 4, 6, 8, etc.) holes depending on the width of the belt 280, paddle 282, strength of material, or other factors. For example, as illustrated in the example of FIGS. 3C and 3D, a belt may have a row of four holes through which two separate threaded inserts 342 may be placed. The use of the reinforced threaded inserts 342 and other features described herein provide increased strength that overcomes belt flexibility (e.g., due to a straight line of holes), rigidity (e.g., due to the configuration of the paddle-mounting bracket 350), strength (e.g., due to the threaded inserts), and other limitations. It should be noted that although threaded inserts 342 are described, they do not necessarily need to be threaded, as welds, bolts, rivets, or other fastening mechanisms are possible and contemplated herein.

FIG. 3E illustrates an example paddle-mounting bracket 350 (also referred to as a diverter-arm mounting bracket 350), which depending on the implementation, may be used to mount a diverter arm or paddle 282 to a diverter belt 280. Although an example paddle-mounting bracket 350 is illustrated, other configurations or mechanisms for attaching the diverter arms/paddles 282 may be used.

As illustrated in the example, a paddle-mounting bracket 350 may have a wide, potentially flat, base member 352 that contacts a diverter belt 280. The base member 352 may be wide enough provide torque to a connected paddle 282 by an edge 354a or 354b pressing against a flat surface of the diverter belt 280, thereby keeping the paddle 282 at a normal or perpendicular angle to the flat surface of the diverter belt 280. The base member 352 may be coupled with the threaded inserts 342 (e.g., at a center line, as shown in FIG. 3A) along a line across the bottom member to provide flexibility thereby allowing the bottom member to move around bent or flexed portion of the diverter belt 280 (e.g., where a pulley or roller is located). The edge 354a or 354b may, when a corresponding point on the converter belt 280 flexes around a pulley, may not be in contact to the diverter belt thereby allowing the belt 280 to flex. Accordingly, the paddle-mounting bracket 350 may provide both strength when pushing objects and flexibility when moving around a pulley, as illustrated in FIGS. 3A and 3B.

In some implementations, the paddle-mounting bracket 350 may include protrusion coupled with the base member 352 and adapted to couple with the diverter arm or paddle 282. As illustrated in the example of FIG. 3E, the protrusion may include a channel 358 into which a paddle 282 may be inserted and which may include perforations 360 or other mechanisms for fastening the paddle 282 (e.g., using bolts, nuts, or other fasteners). In some implementations, the channel 358 may include one or more angles, grooves, wide areas, or wider structures 362, which may match corresponding structures on a paddle 282, thereby providing additional strength to a coupling between the paddle-mounting bracket 350 and the paddle 282. For example, a paddle 282 may slide into the channel 358 and then be fastened using one or more fasteners.

FIG. 3F illustrates an example diverter arm or paddle 282 that couples with the diverter belt 280 at a side or end thereof (e.g., as illustrated in FIG. 3A). For example, two diverter paddles 282 may be mounted at opposing sides/ends of the diverter belt 280. It should also be noted that although an example configuration of a paddle 282 is illustrated, other structures or arms are possible and contemplated herein. For instance, the diverter paddle 282 or arm may be a bar, beam, wedge, block, or other structure or shape.

As illustrated in the example of FIG. 3F, a paddle 282 may be narrower at a first end where it connects with the diverter belt 280 and wider at a second end where it may push items. Various configurations are possible to match wider items, heavier items, a wider diverter belt 280, or other configurations or sizes of these components.

As illustrated, the paddle 282 may have a flat or nearly flat surface (e.g., a contact or pushing surface) on one or both sides that contacts objects to push/divert the objects. The flat surface may have various textures or materials to provide increased or decreased friction, cushioning, or durability. For instance, the second end of the paddle 282 may include a reinforced section 384 to increased durability at a high-use point (e.g., where the paddle 282 contacts objects). In other implementations, the second end of the paddle 282 may brush or rubber sweep to sweep a surface of a diversion or loading area, for example, for small or flat objects.

In some implementations, a paddle 282 may include reinforcing grooves, channels, protrusions, walls, corrugations, or other structures 386, which strengthen the paddle 282 so that it does not deform or break when its surface contacts heavy items.

Figure 4A:
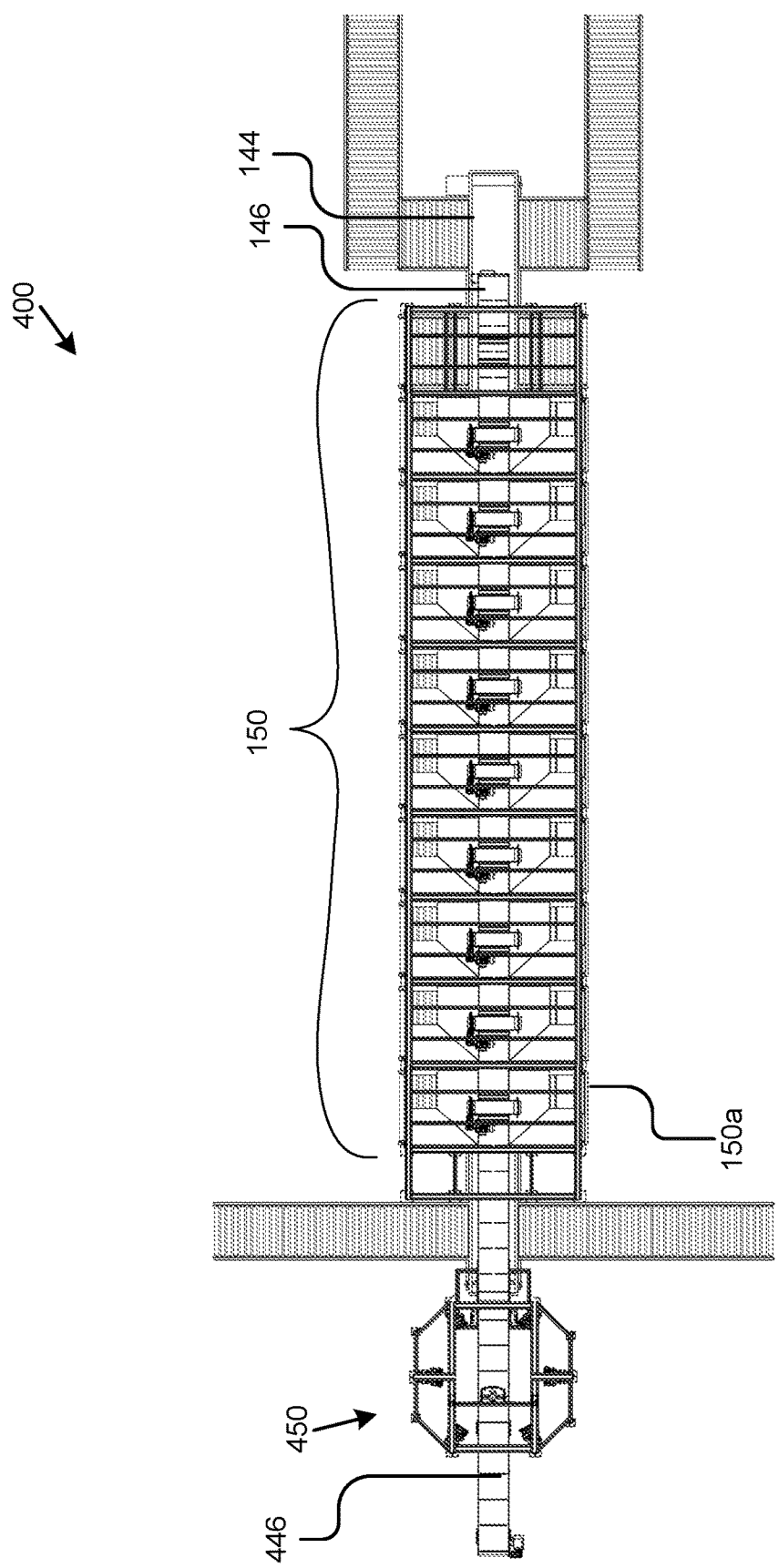
FIGS. 4A and 4B illustrate various views of an example automated sorting and packing system.
Figure 4B:
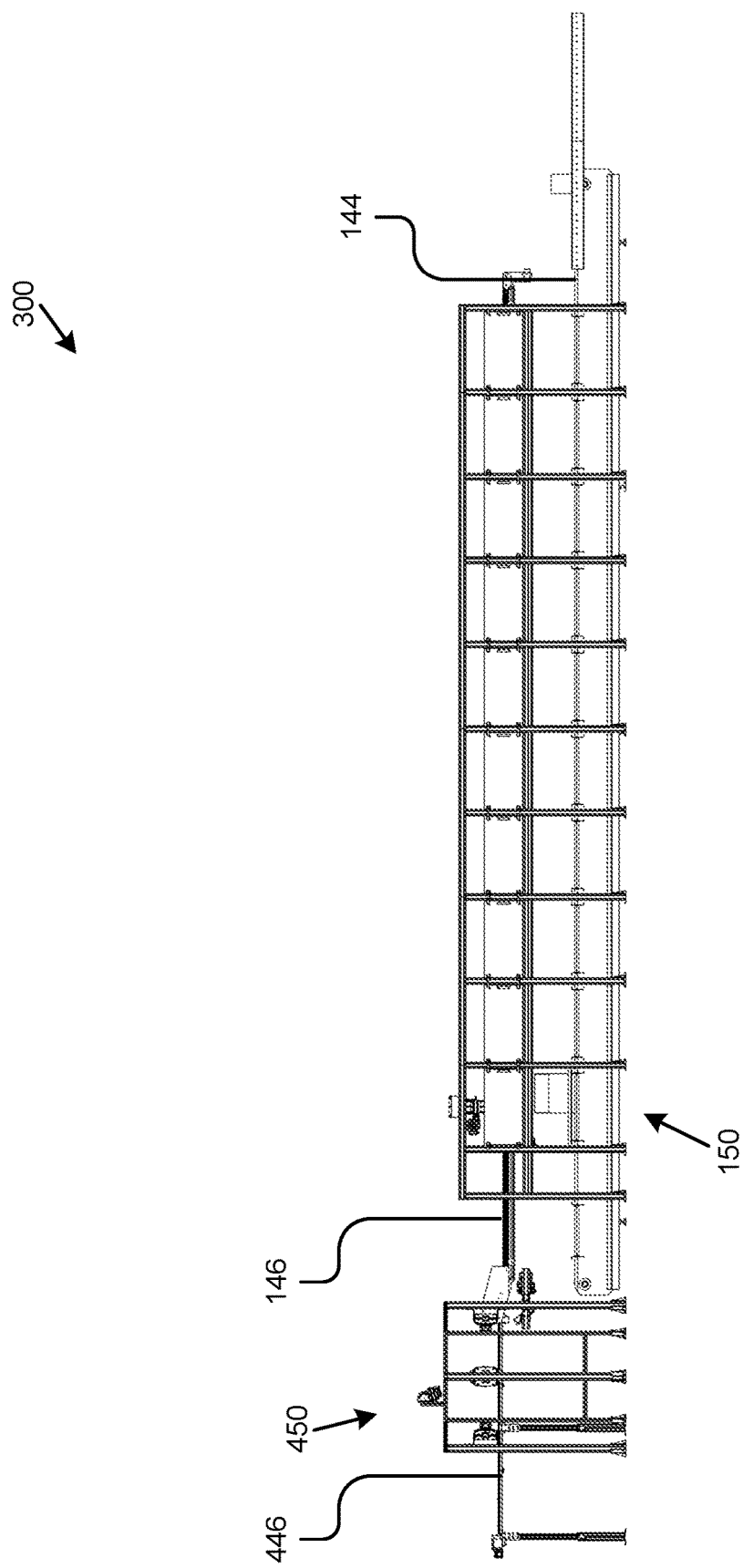
Figure 4C:
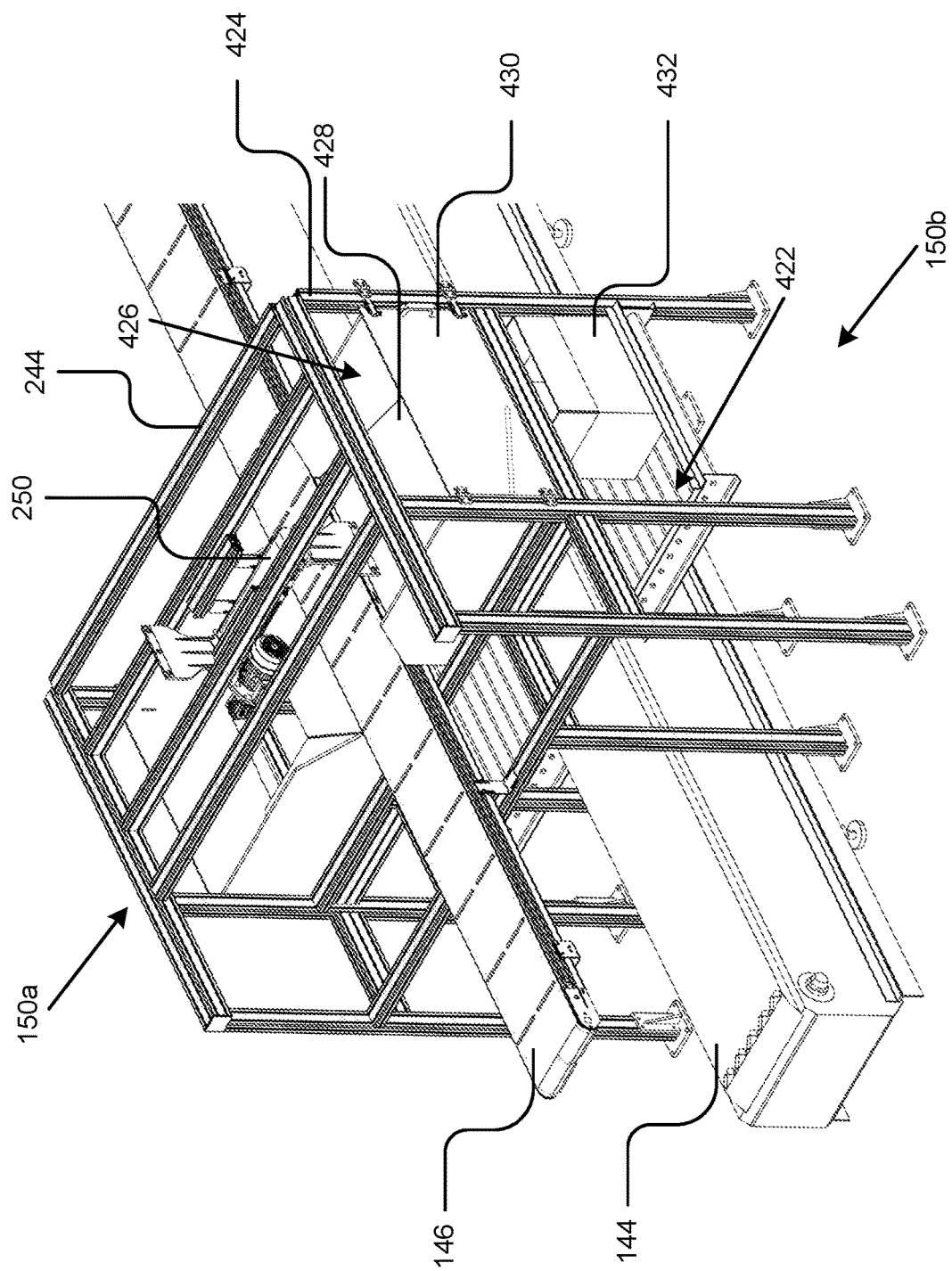
FIGS. 4C and 4D illustrate various views of example transfer stations.

FIG. 4A illustrates a top-down view and FIG. 4B illustrates a side view of an example automated sorting and packing system 400. As illustrated in FIGS. 4A and 4B, the example automated sorting and packing system 400 may include a scan tunnel 450, item conveyor 146, and carton conveyor 144, although other implementations are possible. FIGS. 4A and 4B, as well as other figures herein, provide an example environment where a diverter mechanism 250 may be used and illustrate some of the benefits of features of the diverter mechanism 250.

The item conveyor 146 may convey items to or past one or more transfer stations 150, which may be configured to transfer items between an item conveyor 146 and a carton. As illustrated, example transfer stations 150 are located along both sides of an item conveyor 146 and closely spaced together (e.g., a single transfer station 150a is noted in FIG. 4A, but twenty total transfer stations 150 are illustrated). Example transfer stations 150 are described in further detail in reference to FIGS. 4C and 4D. Accordingly, items can be diverted by diverter mechanisms 250 perpendicularly to a direction of travel of the item conveyor 146 into transfer stations 150 on either side of the item conveyor 146. In some implementations, the transfer stations 150 may be located in sequence next to each other (e.g., touching each other) in a high-density to improve space utilization and sorting speed. Example diverter mechanisms 250 and transfer stations 150 that allow close proximity and rapid sorting are described in further detail elsewhere herein. It should be noted that other configurations are possible and contemplated. For instance, although an example layout and quantity of diverter mechanisms 250 and transfer stations 150 are shown, they may be different in number, layout, or configurations.

A diverter mechanism 250 may sort items from a diversion or loading area on an item conveyor 146 to other locations, such as chutes, conveyors, or transfer stations 150. For example, each transfer station 150 may include a chute (although FIG. 4A only illustrates eighteen of the transfer stations 150 as including chutes, as described below) into which items may be diverted. Additionally, although only nine diverter mechanisms 250 are illustrated in FIG. 4A and a single diverter mechanism 250 is illustrated in FIG. 4B, several diverter mechanisms 250 may be used (e.g., one between each pair of chutes or transfer stations 150). For instance, as illustrated, one or more chutes or transfer stations 150 may be radially located relative to a belt 280.

Because a diverter mechanism 250 may rapidly reset and move, chutes or transfer stations 150 may be positioned very densely, for example, touching each other. Additionally, because a diverter mechanism 250 may divert items in either direction (e.g., direction of movement of a diverter belt 280), locations to which items are diverted (e.g., chutes, transfer stations 150, etc.) may be located on both sides of a diversion area, such as an item conveyor 146. Accordingly, a sorting system using the diverter mechanism(s) 250 may have a significantly smaller footprint due to faster, potentially bi-directional diversion. Similarly, an item conveyor 146, or other conveyor, may carry a higher density of items due to the high speed and automatic reset of diverter paddles 282, as described above. Thus, the density of objects carried on a conveyor, diverted, and sorted may be significantly increased, for example, more than double that of previous systems.

As illustrated, a scan tunnel 450 may be located at the beginning of an item sorter, which is configured to sort items into transfer stations 150 and/or into cartons. For example, the item sorter may include item conveyor(s) 146, diverters, transfer stations 150, and/or other equipment.

As illustrated in the example figures, the system may include an item conveyor 146 with a conveyor belt, which passes by multiple transfer stations 150 (e.g., ten transfer stations 150 or chutes are illustrated on each side of the item conveyor 146). For instance, the item conveyor 146 may include a cleated belt with a zone for each product. The item conveyor 146 may have a variable frequency drive, which allows it to stop or move accurately to allow items to be scanned or diverted, for instance. The item conveyor 146 may include stopping or homing sensor(s), which indicate when an item is next to the correct/assigned chute or transfer station 150. Variable frequency drives and homing sensors may allow the equipment controller(s) 110 or WES 102 to determine when an item has crossed a threshold and should be diverted into a certain transfer station 150 or otherwise tracked.

FIGS. 4A and 4B illustrate ten transfer stations 150 flanking each side of the item conveyors 146 and carton conveyors 144. Although only eighteen of the twenty illustrated transfer stations 150 are illustrated as including chutes in the example of FIG. 4A and two in FIG. 4B for simplicity, the transfer stations 150 may include the same or different configurations. For instance, some of the transfer stations 150 may be designed to accommodate different sizes of orders or cartons or they may be configured to be applicable to any size order or carton. Example transfer stations 150 are described elsewhere herein, for instance, in further detail below in reference to FIGS. 4C and 4D.

Additionally, although only nine diverter mechanisms 250 are illustrated between the pair of chutes in FIG. 4A and a single diverter mechanism 250 in FIG. 4B, there may be several diverter mechanisms 250 in a row (e.g., along the item conveyor 146) or in another configuration.

The item sorter may include chutes and/or transfer stations 150 (in some instances, a transfer station 150 may include a chute 428) located along an item conveyor 146. The item sorter may also include one or multiple diverter mechanisms 250, as described elsewhere herein, which divert items from the item conveyors 146 into a chute 428 and/or transfer station 150. For instance, a transfer station 150 may be proximate to an item conveyor 146, so that a diverter may divert an item from the item conveyor 146, into a chute 428 of the transfer station 150, which causes the item to slide to a consolidation area 426 of the transfer station 150, as described in further detail below, although other implementations are possible.

In some implementations, as illustrated in the example of FIGS. 4A and 4B, an item conveyor 146 may include one or more conveyors that extend longitudinally along an axis and may pass through a scan tunnel 450 and past one or more transfer stations 150 and diverter mechanisms 250, although the item conveyor(s) 146 may have one or more bends or turns. Similarly, the transfer stations 150 may be on a single side, both sides, or configured differently. The transfer stations 150 may be closely spaced, for example, touching each other, in order to increase number of stations that fit in the available space.

In some implementations, the one or more item conveyors 146 may include an induction conveyor 446, which passes through the scan tunnel 450 and from which items may fall or be transferred from the induction conveyor 446 onto another item conveyor 146. The induction conveyor 446 may include painted lines on a conveyor belt, which are spaced so that a robot (e.g., using an optical sensor) or human agent can view the lines and place an item between each line. The space of between the lines may be referred to as an induction zone, and each induction zone may be large enough to fit an item and separate the item from other items on the induction conveyor 446 (e.g., to allow the item to be scanned without interference). In some implementations, depending on the configuration of the scanners 142, items may be placed with a UPC (universal product code) barcode facing upward in each induction zone.

The automated sorting and packing system 400 may also include a carton sorter, which transports cartons (e.g., shipping cartons or boxes) to or from transfer stations 150. For example, a carton sorter may include one or more carton conveyors 144, scanners 142/sensors, diverters, and other devices. For example, a carton conveyor 144 may extend parallel and underneath an item conveyor 146, as illustrated, in order to efficiently use space, and allow the carton conveyor 144 to receive items from transfer stations 150 on both sides.

In some implementations, the one or more carton conveyors 144 may start at a case erector, pass transfer stations 150, pass diverter mechanisms 250, and/or end in a finalizing area. For instance, one or more carton conveyors 144 may originate at case erectors, combine into a single conveyor below an item conveyor 146, and then branch off again to multiple finalizing stations in a finalizing area, although other configurations are possible. For instance, one or both of the item conveyors 146 and carton conveyors 144 may have multiple lanes or branches that convey objects to different areas, transfer station(s), induction area(s), or finalizing area(s).

Figure 4D:
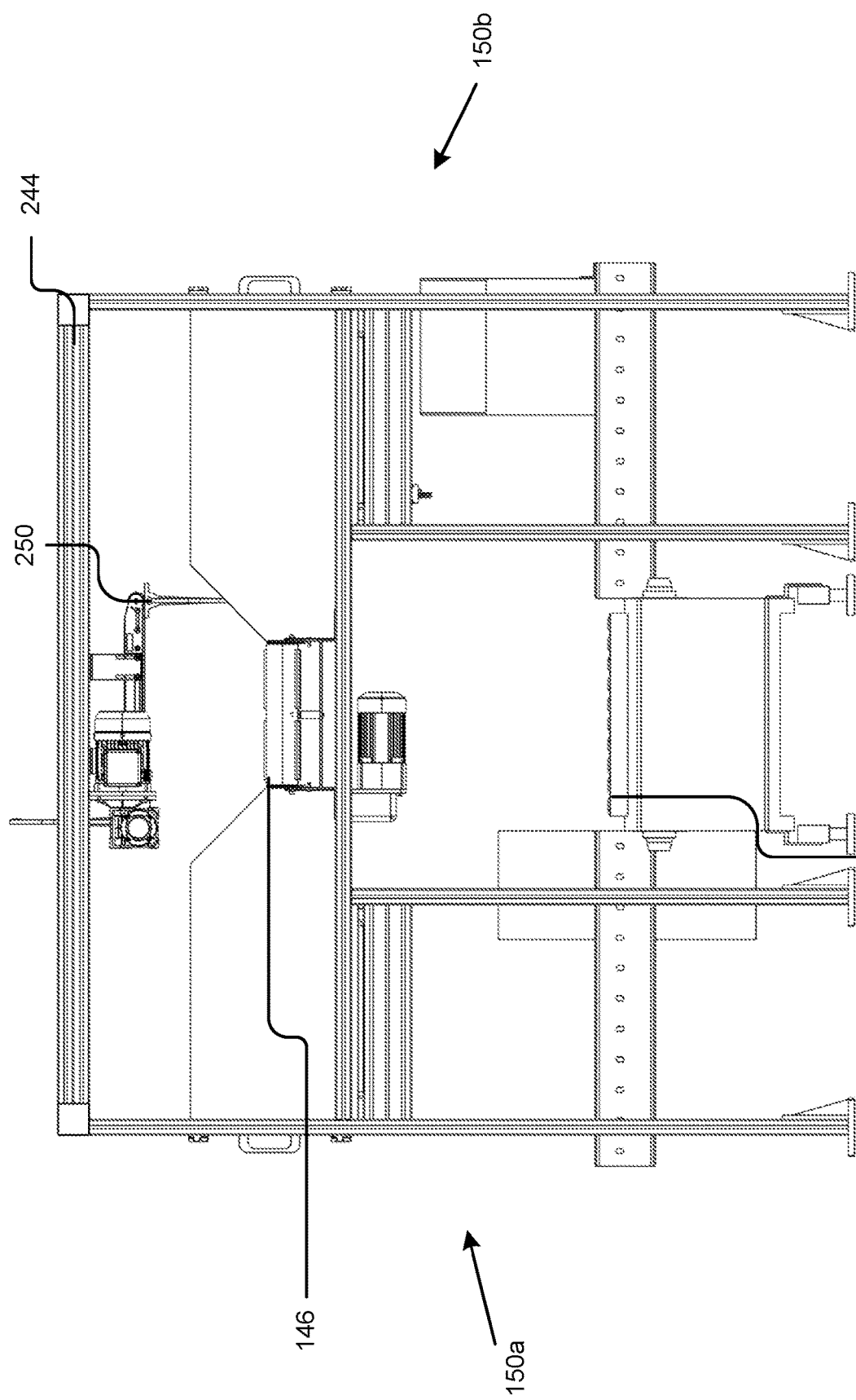

FIG. 4C illustrates a top perspective view and FIG. 4D illustrates an end view of two example transfer stations 150a and 150b with a diverter mechanism 250 located above an item conveyor 146 to transfer items from the item conveyor into the transfer stations 150a or 150b. For example, the diverter mechanism 250 may be mounted across or perpendicular to the item conveyor 146 (e.g., so that the motion of a diverter belt 280 is perpendicular to the motion of an item conveyor 146) to divert items sideways from the item conveyor 146. For example, a diverter mechanism 250 may include a conveyor belt mounted upside down with two or more paddles 282 above the item conveyor 146, as illustrated in the example of FIGS. 4C and 4D.

An example illustrated transfer station 150a or 150b includes a frame 424, an item or transfer station consolidation area 426, a chute 428, and a carton receiving area 422. Other implementations, configurations, and devices may be used in addition or alternative to those illustrated.

The carton receiving area 422 may include rollers, conveyors, or other mechanisms, which align a carton to a corner, edge, or center of the carton receiving area 422. For instance, a carton conveyor 144 may, either using a feature of the carton conveyor 144 or using another diverter mechanism 250, divert a carton into the carton receiving area 422, which may align the carton to a defined point. For example, FIG. 4C illustrates an example carton 432 at a back-side corner in the carton receiving area 422. An opening in the consolidation area 426 may be located at the same corner, so that items may be transferred into any size of carton aligned at the corner.

In some implementations, the transfer station 150 may also include chute walls 430 that prevent items from falling out of the chute 428 or consolidation area 426. One or more of the chute walls 430 may be transparent and/or hinged to allow blockages to be detected and/or dislodged. Additionally, the transfer station 150 may include a sensor that detects when items are in the consolidation area 426, so that blockages may be identified (e.g., if items are still present after they should have been transferred).

The chute 428 may have one or more sloped walls, so that items diverted into the transfer station 150 rest on the chute 428 and/or a door of the opening. For instance, the opening may be closed by a door, as described elsewhere herein.

As illustrated in the example of FIG. 4C, the frame 424 may hold the consolidation area 426 (e.g., with the chute 428 and opening) above the carton 432 and carton receiving area 422. The frame 424 may couple the transfer station 150 to an item conveyor 146, carton conveyor 144, other transfer stations 150, and/or other objects. The frame 424 may also provide mounting points for various scanners 142, sensors, diverters, or other components. The frame 424 may be constructed from extruded aluminum, as shown in the example, but many other constructions are possible and contemplated herein.

FIG. 4C illustrates an example pair of transfer stations 150a and 150b where one is on each side of an item conveyor 146 and a carton conveyor 144. As shown, a transfer station 150a may have both the item conveyor 146 and carton conveyor 144 on a single side, although other implementations are possible, such as where the two conveyors are on opposing sides, perpendicular, or otherwise configured.

As shown in the example of FIG. 4C, a chute 428 may be located downward from the item conveyor 146 (e.g., a top of the chute 428 may descend from an elevation of a top surface of the item conveyor 146) so that when an item is diverted from the item conveyor 146 onto the chute 428, the sloped wall/floor of the chute 428 causes the item to slide toward a door or opening of the consolidation area 426. Additionally, in some implementations, a top surface of the carton receiving area 422 (e.g., the rollers or conveyor thereof) may be level with a top surface of the carton conveyor 144, so that cartons can move to and from the same carton conveyor 144, although other implementations are possible (e.g., where the filled carton is transferred onto a separate, lower carton conveyor 144).

For example, as illustrated in the example of FIG. 4C, the transfer station 150 may include a consolidation area 426 proximate to an item conveyor 146 and a carton receiving area 422 proximate to a carton conveyor 144. The carton conveyor 144 may be partially underneath and parallel with the item conveyor 146 at a point where the item conveyor 146 and carton conveyor 144 are each proximate to the transfer station 150. The consolidation area 426 may be at a higher elevation than the carton receiving area 422.

FIGS. 4C and 4D also illustrate a frame 244 located above the transfer stations 150 to hold an example diverter mechanism 250, as described in further detail above, for example, in reference to FIGS. 2A-2D.

Figure 5:
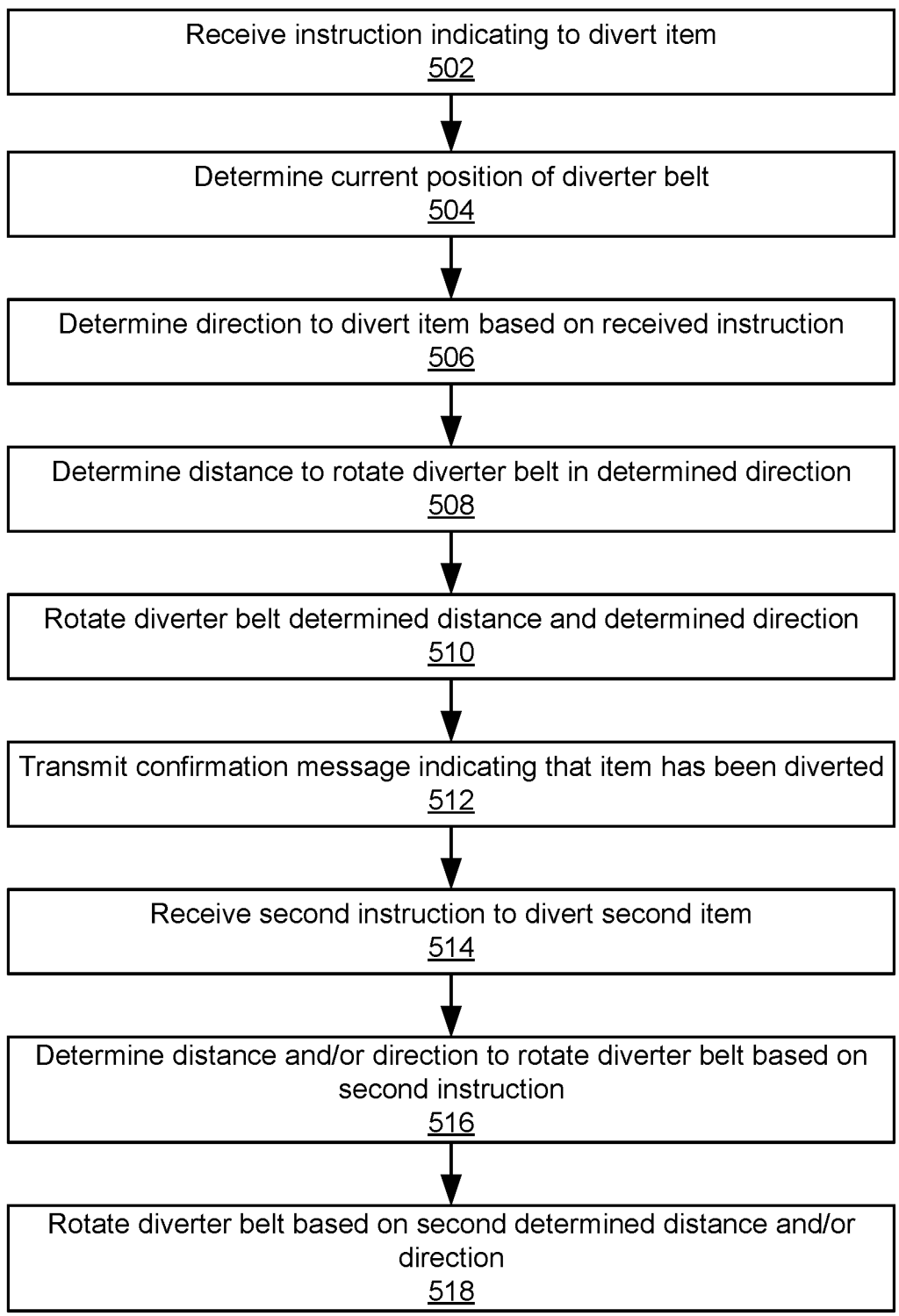
FIG. 5 is a flowchart of an example method for diverting items using an example diverter mechanism.

FIG. 5 is a flowchart of an example method for diverting items using an example diverter mechanism 250. For example, the WES 102 or equipment controller(s) 110 may use operations described in reference to FIG. 5 to divert scanned items from an item conveyor 146 into an assigned transfer station, chute, tray, or other conveyor. Similarly, it may use the operations to divert a carton into an assigned transfer station 150, chute, or conveyor. It should be noted that although certain operations are described, other operations and features are possible. For instance, some of the operations may be omitted, augmented, performed in a different order, or otherwise modified. The operations of FIG. 5 are described in reference to an example equipment controller 110, which may control a diverter mechanism 250 and communicate with a WES 102 or other system. It should be noted that other control systems or arrangements are possible and contemplated herein.

At 502, the equipment controller 110 may receive an instruction indicating to divert an item. For instance, the instruction may indicate a particular item, time, position, and/or direction to divert an item. The instruction may be received from a WES 102, which indicates to divert the item. The equipment controller 110 may use a scanner to identify and detect an item, a sensor (e.g., an optical sensor or contact sensor) to determine a presence of an item, or communication with the WES 102 or another equipment controller 110 (e.g., of the item conveyor 146) to determine a time or item to divert.

At 504, the equipment controller 110 may determine a current position of a diverter belt 280. For instance, the equipment controller 110 may determine a rotation of the diverter belt 280 and, thereby, positions of one or more diverter paddles 282 coupled with the diverter belt 280. For instance, the equipment controller 110 may determine whether a paddle 282 is located on at a center or end of a length of the diverter mechanism 250, whether the paddle(s) 282 are on the top or the bottom of the diverter mechanism 250 (e.g., as illustrated in FIGS. 3A and 3B), or whether the paddles 282 are at another position.

At 506, the equipment controller 110 may determine a direction to divert an item based on the received instruction and/or the current position of the diverter belt 280. For example, in implementations where the diverter belt 280 is adapted to rotate in either direction, thereby diverting items in corresponding directions (e.g., as illustrated in the example of FIGS. 3A and 3B). For instance, where a chute or transfer station is located on either side of a diversion or loading area (e.g., on an item conveyor 146), the equipment controller 110 may determine which direction to rotate the diverter belt 280 and paddles 282 based on the side of the loading area to which the item should be diverted.

At 508, the equipment controller 110 may determine a distance to rotate the belt 280 in the determined direction. The determined distance may use a size of the loading area, distance to a final item location, and current position of a paddle 282 on the diverter belt 280. For example, where an item is being diverted toward a right side, the equipment controller 110 may determine a position of a paddle 282 on the left side (e.g., on a top or bottom at the left end of the diverter mechanism 250) and determine a distance to move the diverter belt 280 (e.g., to move a paddle 282 from the left end to the right end of the diverter mechanism 250).

In some implementations, the equipment controller 110 may use a determined end point in the calculation for how far to move the diverter belt 280 and paddle 282. For instance, if a next diversion is in the same direction, the diverter belt 280 may move slightly farther so the next paddle 282 is on a bottom of the diverter belt 280 (e.g., to be on a bottom left end in the above example) and therefor has a shorter distance to move to divert a subsequent item in the same direction. Similarly, if the next diversion operation is to move an item in the opposite direction (e.g., from right to left), the paddle 282 that pushed the first item may stop on a bottom side (e.g., a bottom right side) of the diverter mechanism 250, so it may move a shorter distance in the opposite direction to divert a second item. Accordingly, efficiency can be further improved.

At 510, the equipment controller 110 may rotate the diverter belt 280 by the determined distance and in the determined direction. For instance, the equipment controller 110 may issue an instruction to the diverter motor 212 to move the diverter belt 280 and paddle(s) 282. In some implementations, the equipment controller 110 may use position, presence, contact, or other sensors to determine or verify that the diverter belt 280/paddle 282 has moved the correct distance. In some instances, the equipment controller 110 may request movement of a paddle 282 from a first end to a second end of the diverter mechanism 250 without determining distances or positions more precisely, which may allow simple or cheaper implementation of the diverter mechanism 250.

In some implementations, the equipment controller 110 may determine, in addition to the determined distance or direction, a speed with which to move the diverter belt 280. For instance, the speed may be a defined quantity or based on other factors, such as a speed of an item conveyor 146 from which items are being diverted, a fragility of the item being diverted, or another factor.

At 512, the equipment controller 110 may transmit a confirmation message indicating that the item has been diverted, for example, to a WES 102 or WMS 104 tracking positions of items. The confirmation message may be based on actuation/movement of the diverter mechanism 250 (e.g., by the determined distance) or data from a sensor (weight, resistance, contact, optical, etc.) on the diverter paddle 282, at the loading area, at the area to which the item is being diverted (e.g., a chute or transfer station 150), or mounted nearby.

In some implementations, the equipment controller 110 may quickly divert one or more subsequent items, for example, based on the instruction at 502, a new instruction at 514, automatically based on arrival of a next item, or based on other criteria. For example, at 514, the equipment controller 110 may receive a second instruction to receive a second item from the WES 102.

At 516, the equipment controller 110 may determine a distance and/or direction to rotate the diverter belt 280 based on the second instruction, for example, as described in reference to steps 504-508 above.

At 518, the equipment controller 110 may rotate the diverter belt 280 based on the second determined distance and/or direction, for example, as described in reference to step 510.

Using the features and operations described herein, the technology allows objects to be diverted or otherwise moved very quickly and efficiently. For instance, various implementations of the diverter mechanism 250 may provide a rapidly resettable diverter that improves density of items and/or locations to which items are diverted. The diverter mechanism 250 and other features and operations described herein provide a rapid, accurate, efficient, and trackable movement of objects.

For example, the WES 102 and/or equipment controller(s) 110 may use one or more item conveyors 146, scanners 142, sensors, and diverters to move the item along a path to the assigned transfer station 150. For instance, the item conveyors 146 may have various paths or lanes to one or multiple transfer stations 150. The WES 102 and/or equipment controller(s) 110 may track (e.g., using a scan and/or a position of the item conveyor(s) 146) the item and transport it to the assigned transfer station 150. In some instances, the equipment controller(s) 110 may determine that the item is at a loading point for the assigned transfer station 150 and, in response, divert the item using a diverter mechanism 250 into a consolidation area 426 of the assigned transfer station 150. For example, the equipment controller(s) 110 may actuate a diverter, such as the diverter mechanism 250 to divert the item from the item conveyor 146 into the consolidation area 426.

For example, an item conveyor 146 may have a cleated belt with a zone for each item. The item conveyor 146 may move the item forward until it reaches an assigned transfer station 150. In some instances, without stopping the item conveyor 146, a diverter mechanism 250 may turn in a direction toward the assigned transfer station 150 to push the item onto a chute 428 of the transfer station 150. The item may slide down the chute 428 and rest against a door of the consolidation area of the transfer station 150. A sensor or scanner 142 communicatively coupled with the equipment controller(s) 110 may confirm that the item has successfully transitioned from the item conveyor 146 into the transfer station 150. The equipment controller(s) 110 may transmit data to the WES 102 confirming that the item was successfully diverted, and the WES 102 may remove the item from a list of items to be sorted for an order. This process may be repeated until the order list for the order associated with the transfer station 150 is empty or the order is otherwise completed.

Figure 6:
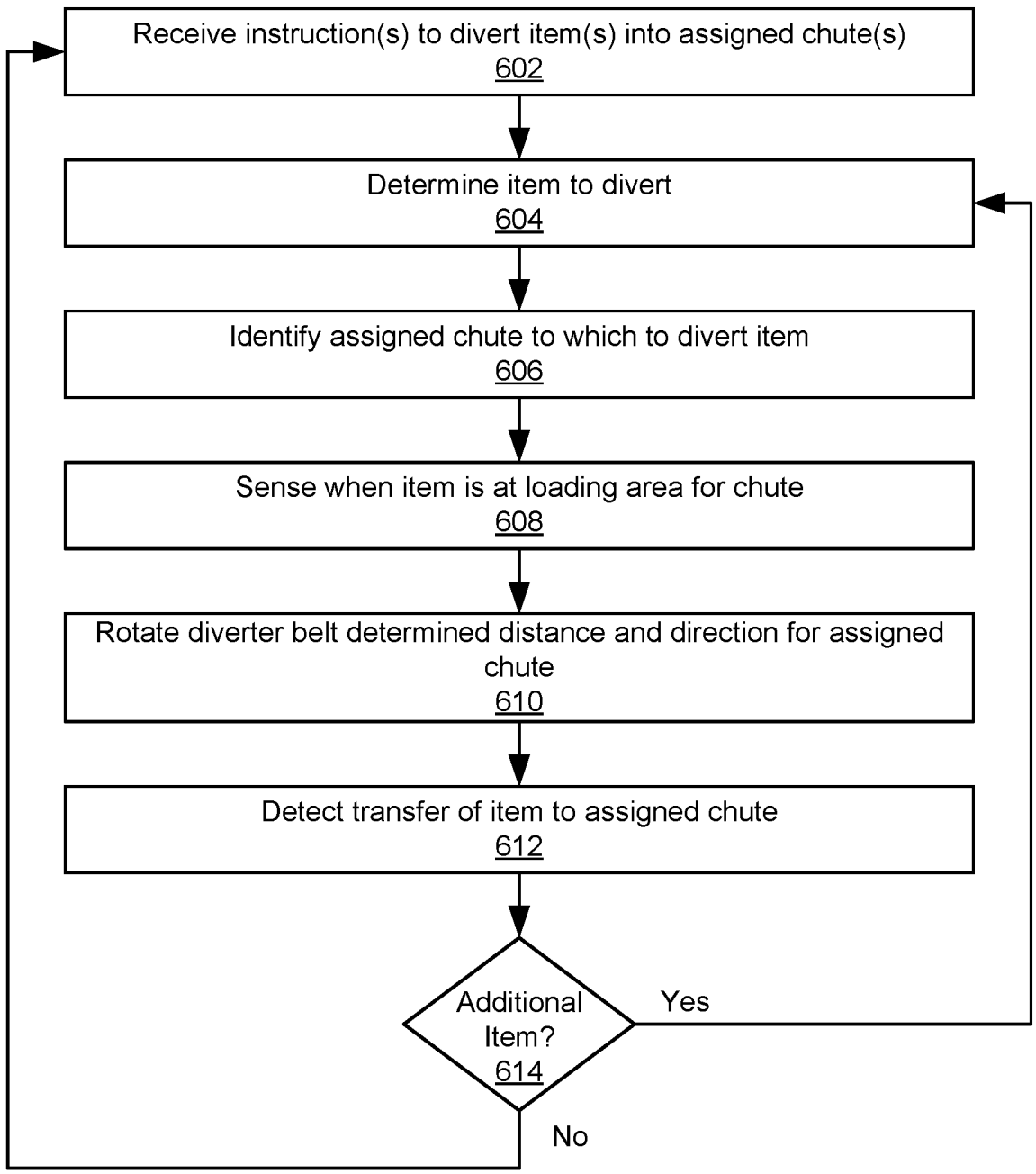
FIG. 6 is a flowchart of an example method for sorting items, for example, using a diverter mechanism.

FIG. 6 is a flowchart of an example method for sorting items, for example, using a diverter mechanism 250. The operations of the method described in reference to FIG. 6 may be used in addition or alternative to those described elsewhere herein, for example those described in reference to FIG. 5.

At 602, an equipment controller 110 may receive instruction(s) to divert item(s) into assigned chute(s) or other end points. The equipment controller 110 may be communicatively coupled with one or a plurality of diverter mechanisms 250, which may be associated with one or more chutes, such as those described and illustrated in reference to FIG. 4A, although other implementations are possible, such as other conveyors, AGV 114 robots, chutes that lead to picking stations, or other locations. Depending on the implementation, a single diverter mechanism 250 may be configured to divert items to multiple locations, such as two chutes or transfer stations on opposing sides of the diverter mechanism 250, as illustrated in the example of FIG. 4C.

At 604, the equipment controller 110 may determine an item to divert. In some implementations, the specific item may be associated with a barcode or UPC (universal product code), so that it can be identified by a scan using a scanner or other sensor. In some implementations, the item may be associated with a certain location on an item conveyor 146, so that when the item location is located below (or otherwise in a loading area) of a diverter mechanism 250, it may be automatically diverted.

At 606, the equipment controller 110 may determine an assigned chute (although other locations are possible) to which to divert the item. In instances where there are chutes on both sides of diversion or loading area, which correspond to opposing directions of movement of a diverter belt 280, the equipment controller 110 may determine a direction with which to divert the item. In instances where there are several diverter mechanisms 250 each with one or more locations to which they may divert items, the equipment controller 110 may determine those locations, directions, distances, and/or diverter mechanisms 250 to be used.

In some implementations, the equipment controller 110 may also determine certain other sensors or equipment associated with the chute, location, or direction to which an item is assigned to be diverted by the diverter mechanism 250. For instance, the equipment controller 110 may verify that an item has been diverted to a first chute using a first sensor associated with the first chute or verify that an item has been diverted to a second chute using a second sensor associated with the second chute.

At 608, the equipment controller 110 may sense when the item is at the loading area for the chute, for example, based on a scan of the item, a location of an item conveyor 146, a beam-break sensor, or another sensor associated with the diverter mechanism 250 and/or the chute.

At 610, the equipment controller 110 may rotate the diverter belt 280 a determined distance and direction for the assigned chute. As noted above, the chute may be a certain distance or direction from the equipment controller 110 so the movement of the diverter belt 280 may be determined based on the location of the chute relative to the paddle(s) 282 of the diverter mechanism 250.

At 612, the equipment controller 110 may detect transfer of the item to the assigned chute, for example, based on activation/movement of the diverter belt 280 and/or an external sensor, as described in more detail above.

At 614, the equipment controller 110 may determine whether there are additional items to sort based on the instruction(s). For instance, if there is another item in a list or queue of items to sort or divert, the equipment controller 110 may return to 604 or another operation, depending on the implementation.

Figure 7:
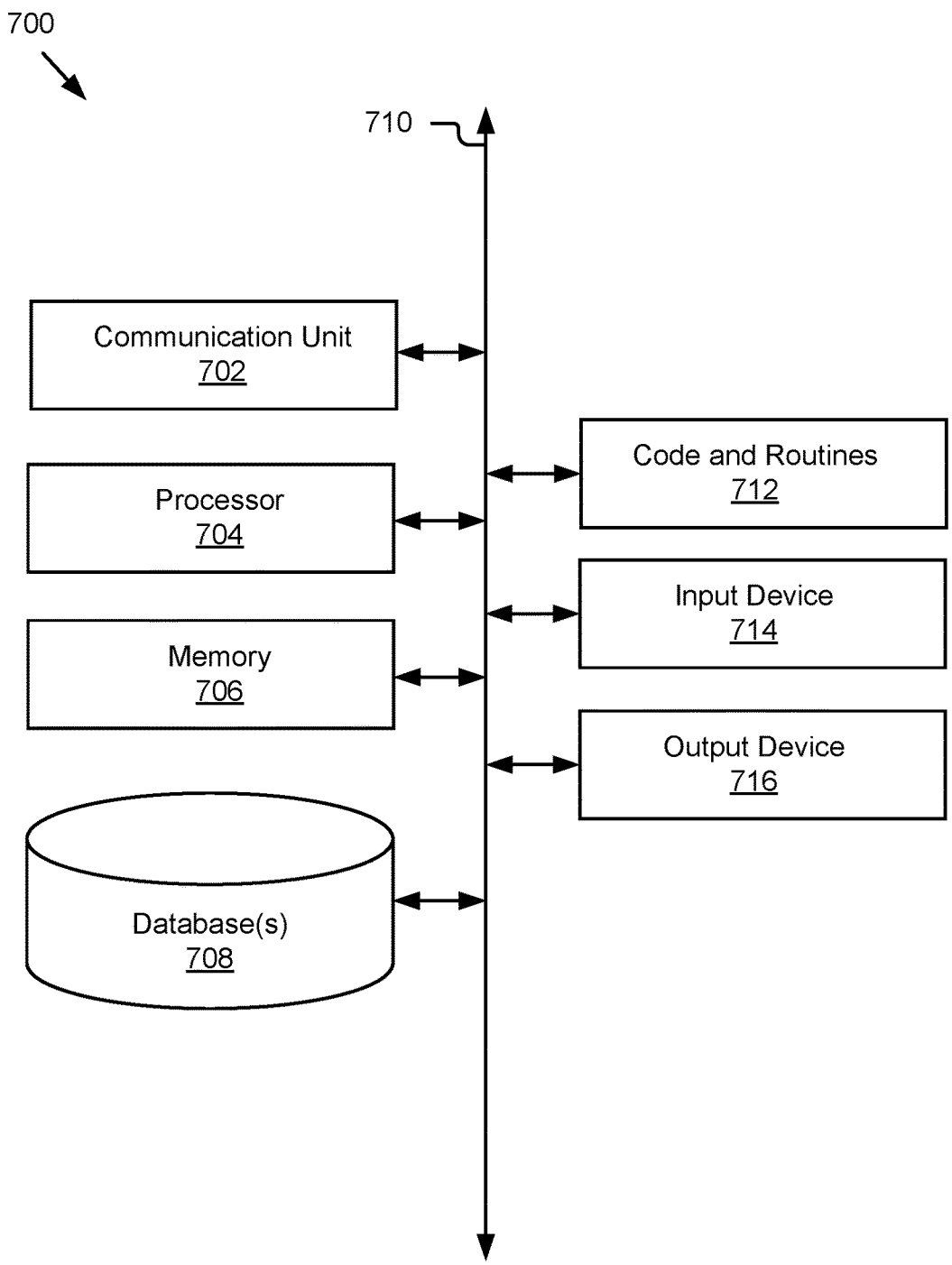
FIG. 7 is a block diagram illustrating an example computing system.

FIG. 7 is a block diagram illustrating an example computing system 700. The example computing system 700 may correspond to a WES 102, a WMS 104, a dispatch system 106, a human interface system 108, equipment controller(s) 110, REX 118, a client device, or other component of the system 100, for example.

The code and routines 712 may include computer logic executable by the processor 704 on a computing system 700 to provide for the functionality described in reference to one or more of the components of the system 100. For instance, in some implementations, the code and routines may include one or more of the components of the WES 102 or equipment controller(s) 110.

As depicted, the computing system 700 may include a processor 704, a memory 706, a communication unit 702, an output device 716, an input device 714, and database(s) 708, which may be communicatively coupled by a communication bus 710. The computing system 700 may be coupled with various sensors, motors, or other components of the diverter mechanism 250, such as those described above. The computing system 700 depicted in FIG. 7 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 700 may include various operating systems, sensors, additional processors, and other physical configurations. Although, for purposes of clarity, FIG. 7 only shows a single processor 704, memory 706, communication unit 702, etc., it should be understood that the computing system 700 may include a plurality of one or more of these components.

The processor 704 may execute software instructions by performing various input, logical, and/or mathematical operations. The processor 704 may have various computing architectures to process data signals including, for example, a complex instruction set computer (CISC) architecture, a reduced instruction set computer (RISC) architecture, and/or an architecture implementing a combination of instruction sets. The processor 704 may be physical and/or virtual, and may include a single core or plurality of processing units and/or cores. In some implementations, the processor 704 may be capable of generating and providing electronic display signals to a display device, supporting the display of images, capturing and transmitting images, performing complex tasks including various types of feature extraction and sampling, etc. In some implementations, the processor 704 may be coupled to the memory 706 via the bus 710 to access data and instructions therefrom and store data therein. The bus 710 may couple the processor 704 to the other components of the computing system 700 including, for example, the memory 706, the communication unit 702, the input device 714, the output device 716, and the database(s) 708.

The memory 706 may store and provide access to data to the other components of the computing system 700. The memory 706 may be included in a single computing device or a plurality of computing devices. In some implementations, the memory 706 may store instructions and/or data that may be executed by the processor 704. For example, the memory 706 may store the code and routines 712. The memory 706 is also capable of storing other instructions and data, including, for example, an operating system, hardware drivers, other software applications, databases, etc. The memory 706 may be coupled to the bus 710 for communication with the processor 704 and the other components of computing system 700.

The memory 706 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 704. In some implementations, the memory 706 may include one or more of volatile memory and non-volatile memory (e.g., RAM, ROM, hard disk, optical disk, etc.). It should be understood that the memory 706 may be a single device or may include multiple types of devices and configurations.

The bus 710 can include a communication bus for transferring data between components of a computing device or between computing devices, a network bus system including a network or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 702 may include one or more interface devices (I/F) for wired and wireless connectivity among the components of the system 100. For instance, the communication unit 702 may include various types known connectivity and interface options. The communication unit 702 may be coupled to the other components of the computing system 700 via the bus 710. The communication unit 702 may be electronically communicatively coupled to a network (e.g., wiredly, wirelessly, etc.). In some implementations, the communication unit 702 can link the processor 704 to a network, which may in turn be coupled to other processing systems. The communication unit 702 can provide other connections to a network and to other entities of the system 100 700 using various standard communication protocols.

The input device 714 may include any device for inputting information into the computing system 700. In some implementations, the input device 714 may include one or more peripheral devices. For example, the input device 714 may include a keyboard, a pointing device, microphone, an image/video capture device (e.g., camera), a touch-screen display integrated with the output device 716, etc.

The output device 716 may be any device capable of outputting information from the computing system 700. The output device 716 may include one or more of a display (LCD, OLED, etc.), a printer, a 3D printer, a haptic device, audio reproduction device, touch-screen display, etc. In some implementations, the output device is a display which may display electronic images and data output by the computing system 700 for presentation to a user, such as a picker or associate in the order fulfillment center. In some implementations, the computing system 700 may include a graphics adapter (not shown) for rendering and outputting the images and data for presentation on output device 716. The graphics adapter (not shown) may be a separate processing device including a separate processor and memory (not shown) or may be integrated with the processor 704 and memory 706.

The database(s) are information source(s) for storing and providing access to data. The data stored by the database(s) 708 may be organized and queried using various criteria including any type of data stored by them, such as the data in the data store 120 and other data discussed herein. The database(s) 708 may include file systems, data tables, documents, databases, or other organized collections of data. Examples of the types of data stored by the database(s) 708 may include the data described herein, for example, in reference to the data store 120.

The database(s) 708 may be included in the computing system 700 or in another computing system and/or storage system distinct from but coupled to or accessible by the computing system 700. The database(s) 708 can include one or more non-transitory computer-readable mediums for storing the data. In some implementations, the database(s) 708 may be incorporated with the memory 706 or may be distinct therefrom. In some implementations, the database(s) 708 may store data associated with a database management system (DBMS) operable on the computing system 700. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A diverter mechanism comprising:
   a belt coupled with one or more pulleys, the belt including a closed loop of material, the one or more pulleys providing support to the belt;
   a motor coupled with the one or more pulleys and providing motive force to the belt via the one or more pulleys;
   one or more diverter arms coupled with the belt, each of the one or more diverter arms including a body with a first arm end, a second arm end, a first pushing surface, and a second pushing surface opposing the first pushing surface, the body being coupled with the belt at the first arm end, the second arm end extending away from the belt, and the first pushing surface or the second pushing surface contacting one or more objects to push the one or more objects;
   a mounting bracket coupling a first diverter arm of the one or more diverter arms with the belt, the mounting bracket including:
      a belt-contacting surface contacting a first surface of the belt and including a center region, a first side extending away from the center region and beyond the first pushing surface, and a second side extending away from the center region in a direction opposite to the first side and beyond the second pushing surface, the first side and the second side of the belt-contacting surface configured to contact the belt when the belt is flat and to disconnect from the belt when the belt flexes away from the first side and the second side; and
      a diverter-arm holding portion extending perpendicularly to the belt-contacting surface at the center region, the diverter-arm holding portion receiving and holding the first arm end of the first diverter arm, the center region receiving two or more fasteners in a direction perpendicular to the belt-contacting surface to fasten the mounting bracket to the belt at the center region;
   one or more threaded inserts coupling with the mounting bracket using the two or more fasteners including:
      two or more threaded portions receiving the two or more fasteners through the center region of the mounting bracket, the two or more threaded portions being mounted in two or more holes of the belt; and
      a bridge member extending between and coupling the two or more threaded portions, the bridge member contacting a second surface of the belt and preventing the two or more threaded portions from pulling through the two or more holes when coupled with the two or more fasteners; and
   a controller coupled with the motor to instruct the motor to rotate the belt.

2. The diverter mechanism of claim 1, wherein the one or more diverter arms include:
   a first paddle mounted to a first point on the belt; and
   a second paddle mounted to a second point on the belt.

3. The diverter mechanism of claim 2, wherein:
   the first point is substantially opposite to the second point around a circumference of the closed loop of the belt.

4. The diverter mechanism of claim 3, wherein:
   the first point and the second point are separated on at least one side by a length of the material of the belt, the length of the belt including no diverter arms.

5. The diverter mechanism of claim 1, wherein:
   the body of the one or more diverter arms is elongated and the elongated body extends longitudinally away from the belt at the first arm end.

6. The diverter mechanism of claim 1, further comprising:
   the mounting bracket coupling the first arm end of the one or more diverter arms with the belt, the mounting bracket including a first point that remains in contact with the belt when the belt flexes around the one or more pulleys, the mounting bracket including a second point that is in contact with the belt when the belt is flat at the second point and not in contact with the belt when the belt flexes around the one or more pulleys at the second point.

7. The diverter mechanism of claim 1, wherein:
   the first diverter arm of the one or more diverter arms includes the first pushing surface and the second pushing surface, the first pushing surface pushing the one or more objects toward a first end of the diverter mechanism when the motor rotates in a first direction and the second pushing surface pushing the one or more objects in toward a second end of the diverter mechanism when the motor rotates in a second direction opposite to the first direction.

8. The diverter mechanism of claim 1, wherein:
   the one or more diverter arms include the first diverter arm attached to the belt and a second diverter arm attached to the belt, the first diverter arm moving toward a first end of the diverter mechanism and the second diverter arm moving toward a second end of the diverter mechanism when the belt rotates around the one or more pulleys, the first end of the diverter mechanism being opposite to the second end of the diverter mechanism.

9. The diverter mechanism of claim 1, further comprising:
   a frame coupled with and providing support to the one or more pulleys, the frame mounting the belt above a loading area, the first pushing surface of the one or more diverter arms extending into the loading area to push an item from the loading area.

10. The diverter mechanism of claim 1, wherein the belt includes:
one or more ribs coupled with the first pushing surface and providing rigidity to the first pushing surface, the one or more ribs extending from an edge of the mounting bracket at the diverter-arm holding portion and toward the second arm end.

11. A method comprising:
determining, by one or more processors, a first direction to divert a first item from a loading area based on a first instruction;
determining, by the one or more processors, a first distance from a first position of a belt to rotate the belt in the first direction; and
rotating, by the one or more processors, the belt around one or more pulleys by the first distance in the first direction from the first position to a second position, the belt having one or more diverter arms coupled with the belt by a mounting bracket and one or more threaded inserts, the one or more diverter arms moving with the rotation of the belt, the one or more diverter arms including a first diverter arm, the first diverter arm including a first pushing surface and a second pushing surface opposing the first pushing surface, the mounting bracket including:
a belt-contacting surface contacting a first surface of the belt and including a center region, a first side extending away from the center region and beyond the first pushing surface, and a second side extending away from the center region in a direction opposite to the first side and beyond the second pushing surface, the first side and the second side of the belt-contacting surface configured to contact the belt when the belt is flat and to disconnect from the belt when the belt flexes away from the first side and the second side; and
a diverter-arm holding portion extending perpendicularly to the belt-contacting surface at the center region, the diverter-arm holding portion including a channel configured to receive and hold an end of the first diverter arm, the channel including a coupling portion configured to receive two or more fasteners through the channel in a direction perpendicular to the belt-contacting surface to fasten the mounting bracket to the belt at the center region; the one or more threaded inserts coupling with the mounting bracket using the two or more fasteners including:
two or more threaded portions receiving the two or more fasteners through the channel, the two or more threaded portions being mounted in two or more holes of the belt; and
a bridge member extending between and coupling the two or more threaded portions, the bridge member contacting a second surface of the belt and preventing the two or more threaded portions from pulling through the two or more holes when coupled with the two or more fasteners.

12. The method of claim 11, further comprising:
moving, by the one or more processors, the first item on a conveyor in a second direction, the second direction being perpendicular to the first direction, the loading area being on the conveyor, the first item being diverted from the conveyor by the one or more diverter arms when the belt is rotated in the first direction.

13. The method of claim 11, further comprising:
determining, by the one or more processors, that the first item has been diverted by the rotation of the belt, the one or more diverter arms contacting the first item to divert the first item; and
transmitting, by the one or more processors, a confirmation message to a computing system indicating that the first item has been diverted.

14. The method of claim 11, wherein rotating the belt by the first distance in the first direction includes:
moving the first diverter arm of the one or more diverter arms from a first end of a diverter mechanism to a second end of the diverter mechanism to divert the first item, the diverter mechanism including the belt, the one or more diverter arms, and a motor applying motive force to the belt; and
moving a second diverter arm of the one or more diverter arms to the first end based on moving the first diverter arm from the first end of the diverter mechanism to the second end of the diverter mechanism.

15. The method of claim 11, further comprising:
determining, by the one or more processors, to divert a second item based on a second instruction; and
diverting the second item including rotating, by the one or more processors, the belt in a second direction from the second position to a third position, the second direction being opposite to the first direction.

16. The method of claim 11, further comprising:
determining, by the one or more processors, to divert a second item based on a second instruction; and
diverting the second item including rotating, by the one or more processors, the belt in a second direction from the second position to a third position, the second direction being the same as the first direction.

17. The method of claim 11, further comprising:
determining, by the one or more processors, a time at which to rotate the belt by the first distance in the first direction to divert the first item based on a sensor indicating that the first item is at the loading area for the one or more diverter arms; and
diverting the first item including rotating, by the one or more processors, the belt by the first distance in the first direction at the determined time.

18. The method of claim 11, further comprising:
determining, by the one or more processors, an assigned chute to which to divert the first item based on the first instruction, the first direction being a direction of movement of an under-side of the belt from the first position of the belt toward the assigned chute; and
diverting, by the one or more processors, the first item into the assigned chute including rotating the belt by the first distance in the first direction.

19. The method of claim 18, wherein determining the assigned chute to which to divert the first item includes:
selecting, by the one or more processors, the assigned chute from a pair of chutes including a first chute and a second chute, the first chute being located at a first end of a diverter mechanism and the second chute being located at a second end of the diverter mechanism, the diverter mechanism including the belt and the one or more diverter arms, the pair of chutes being radially located relative to the belt.

20. A system comprising:
means for determining a first direction to divert a first item from a loading area based on a first received instruction;

means for determining a first distance from a first position of a belt to rotate the belt in the first direction;

means for rotating the belt around one or more pulleys by the first distance in the first direction from the first position to a second position, the belt having one or more diverter arms coupled with the belt by a mounting bracket, the one or more diverter arms moving with the rotation of the belt, the one or more diverter arms including a first diverter arm, the first diverter arm including a first pushing surface and a second pushing surface opposing the first pushing surface, the mounting bracket including:

- a belt-contacting surface contacting a first surface of the belt and including a center region, a first side extending away from the center region and beyond the first pushing surface, and a second side extending away from the center region in a direction opposite to the first side and beyond the second pushing surface, the first side and the second side of the belt-contacting surface configured to contact the belt when the belt is flat and to disconnect from the belt when the belt flexes away from the first side and the second side; and
- a diverter-arm holding portion extending perpendicularly to the belt-contacting surface at the center region, the diverter-arm holding portion including a means for receiving and holding an end of the first diverter arm, the means for receiving and holding the end of the first diverter arm including a coupling portion configured to receive two or more fastening means in a direction perpendicular to the belt-contacting surface to fasten the mounting bracket to the belt at the center region, and a means for coupling the mounting bracket with the belt using the two or more fastening means including:
- two or more fastening means receiving members receiving the two or more fastening means at the center region, the two or more fastening means receiving members being mounted in two or more holes of the belt; and
- a bridge member extending between and coupling the two or more fastening means receiving members, the bridge member contacting a second surface of the belt and preventing the two or more fastening means receiving members from pulling through the two or more holes when coupled with the two or more fastening means.

* * * * *